United States Patent
Ikeda et al.

(10) Patent No.: US 9,519,126 B2
(45) Date of Patent: Dec. 13, 2016

(54) ZOOM LENS AND IMAGING APPARATUS

(71) Applicant: FUJIFILM Corporation, Tokyo (JP)

(72) Inventors: Shinkichi Ikeda, Saitama-ken (JP); Toshihiro Aoi, Saitama-ken (JP)

(73) Assignee: FUJIFILM Corporation, Tokyo (JP)

(*) Notice: Subject to any disclaimer, the term of this patent is extended or adjusted under 35 U.S.C. 154(b) by 64 days.

(21) Appl. No.: 14/702,952

(22) Filed: May 4, 2015

(65) Prior Publication Data
US 2015/0247996 A1 Sep. 3, 2015

Related U.S. Application Data

(63) Continuation of application No. PCT/JP2013/006453, filed on Oct. 31, 2013.

(30) Foreign Application Priority Data

Nov. 8, 2012 (JP) .................. 2012-246209

(51) Int. Cl.
*G02B 15/14* (2006.01)
*G02B 9/34* (2006.01)
(Continued)

(52) U.S. Cl.
CPC ............. *G02B 15/17* (2013.01); *G02B 15/173* (2013.01); *G02B 27/646* (2013.01);
(Continued)

(58) Field of Classification Search
CPC ... G02B 27/646; G02B 27/0025; G02B 15/20; G02B 9/34; G02B 13/009; G02B 13/0045; G02B 7/023; G02B 7/10; G02B 15/14; G02B 5/005
(Continued)

(56) References Cited

U.S. PATENT DOCUMENTS

| 5,737,127 A | 4/1998 | Tsutsumi |
| 6,989,942 B1 | 1/2006 | Nurishi |

(Continued)

FOREIGN PATENT DOCUMENTS

| JP | 08-114744 | 5/1996 |
| JP | 2004-110079 | 4/2004 |

(Continued)

OTHER PUBLICATIONS

International Search Report, PCT/JP2013/006453, Mar. 18, 2014.
Chinese Official Action—201380058106.0—Jun. 7, 2016.

*Primary Examiner* — Evelyn A Lester
(74) *Attorney, Agent, or Firm* — Young & Thompson

(57) ABSTRACT

A zoom lens consists of a positive first lens group, a negative second lens group moved from the object side to the image plane side during zooming from the wide angle end to the telephoto end, a positive third lens group moved during zooming, and a positive fourth lens group, in order from the object side. The second and third lens groups each pass through a point where the imaging magnification of each corresponding lens group is −1× at the same time during zooming from the wide angle end to the telephoto end. The fourth lens group includes, on the most object side, a vibration-proof lens group, composed of a negative lens, a positive meniscus lens with a convex surface on the object side, and a negative lens, in order from the object side, and either one of the negative lenses satisfies predetermined conditional expressions.

8 Claims, 20 Drawing Sheets

EXAMPLE 1
REPRESENTATIVE DRAWING (WIDE)

(51) Int. Cl.
*G02B 15/17* (2006.01)
*G02B 15/173* (2006.01)
*H04N 5/232* (2006.01)
*G02B 27/64* (2006.01)
*G02B 27/00* (2006.01)
*G02B 13/00* (2006.01)
*G02B 7/02* (2006.01)
*G02B 7/10* (2006.01)
*G02B 5/00* (2006.01)
*G02B 15/20* (2006.01)

(52) U.S. Cl.
CPC ....... *H04N 5/2328* (2013.01); *H04N 5/23287* (2013.01); *G02B 5/005* (2013.01); *G02B 7/023* (2013.01); *G02B 7/10* (2013.01); *G02B 9/34* (2013.01); *G02B 13/009* (2013.01); *G02B 13/0045* (2013.01); *G02B 15/14* (2013.01); *G02B 15/20* (2013.01); *G02B 27/0025* (2013.01); *G03B 2205/0015* (2013.01); *G03B 2205/0046* (2013.01)

(58) Field of Classification Search
USPC ................ 359/557, 683–687, 715, 740, 774
See application file for complete search history.

(56) References Cited

U.S. PATENT DOCUMENTS

| | | | |
|---|---|---|---|
| 8,264,779 B2* | 9/2012 | Nakayama | G02B 15/173 359/676 |
| 2011/0188130 A1* | 8/2011 | Sato | G02B 15/14 359/687 |
| 2011/0205636 A1* | 8/2011 | Ito | G02B 27/646 359/684 |
| 2011/0279898 A1 | 11/2011 | Takemoto et al. | |
| 2011/0317269 A1* | 12/2011 | Paolilli | B32B 37/025 359/576 |
| 2012/0019924 A1 | 1/2012 | Shimomura | |
| 2012/0113516 A1* | 5/2012 | Kimura | G02B 27/646 359/557 |
| 2012/0154913 A1* | 6/2012 | Misaka | G02B 27/646 359/557 |
| 2014/0036138 A1* | 2/2014 | Komatsu | G02B 13/18 359/684 |
| 2014/0362450 A1 | 12/2014 | Shimomura | |

FOREIGN PATENT DOCUMENTS

| | | |
|---|---|---|
| JP | 2009-128491 | 6/2009 |
| JP | 2011-242438 | 12/2011 |
| JP | 2012-027308 | 2/2012 |

* cited by examiner

FIG.11
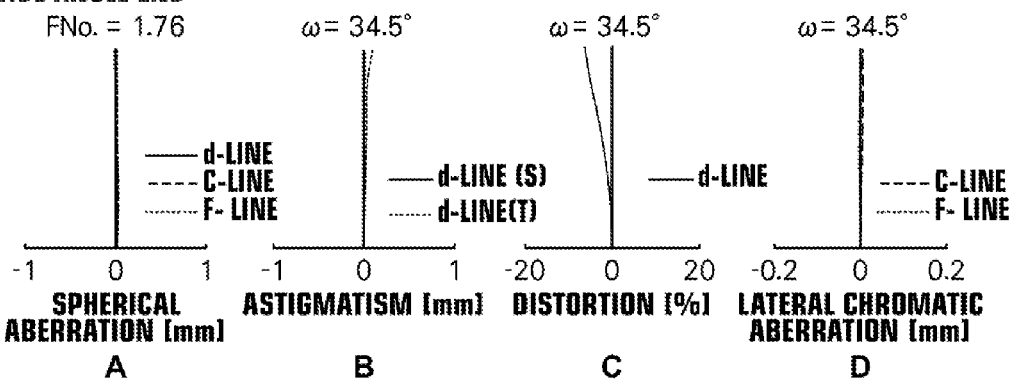
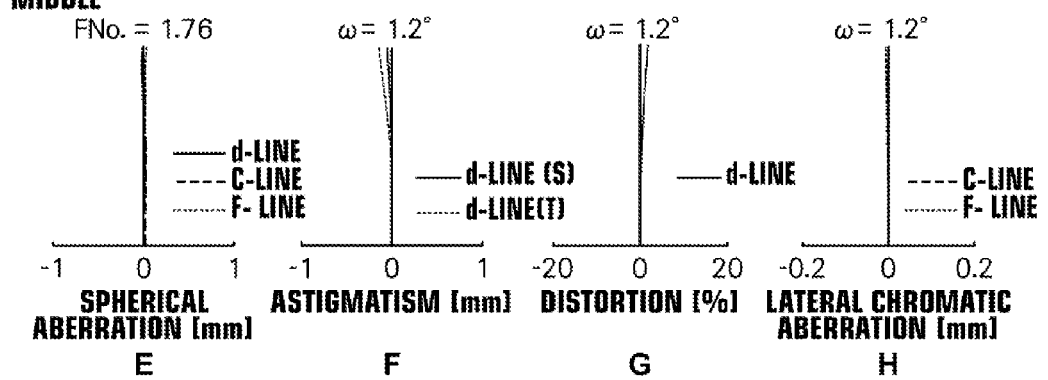
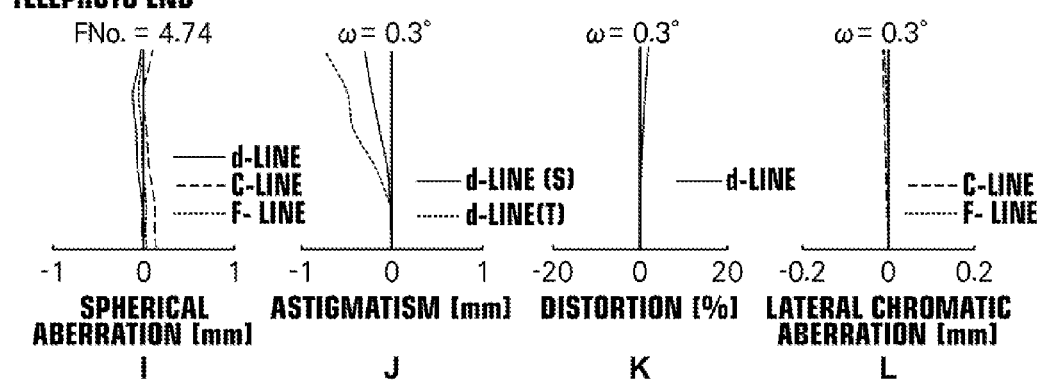

FIG.13
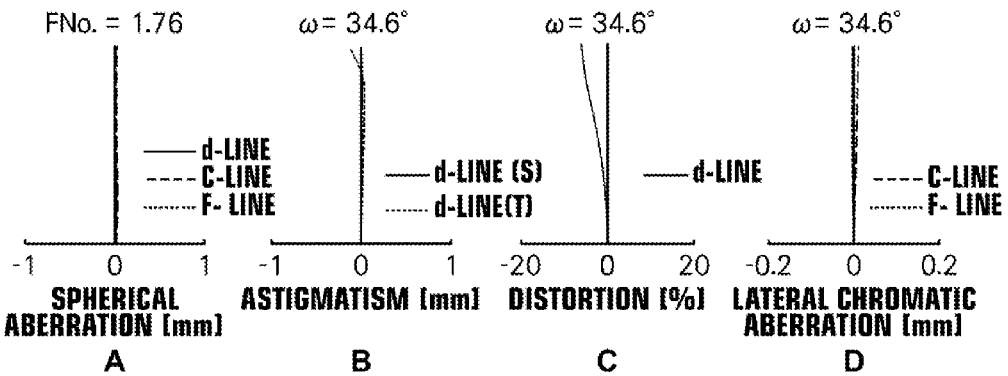
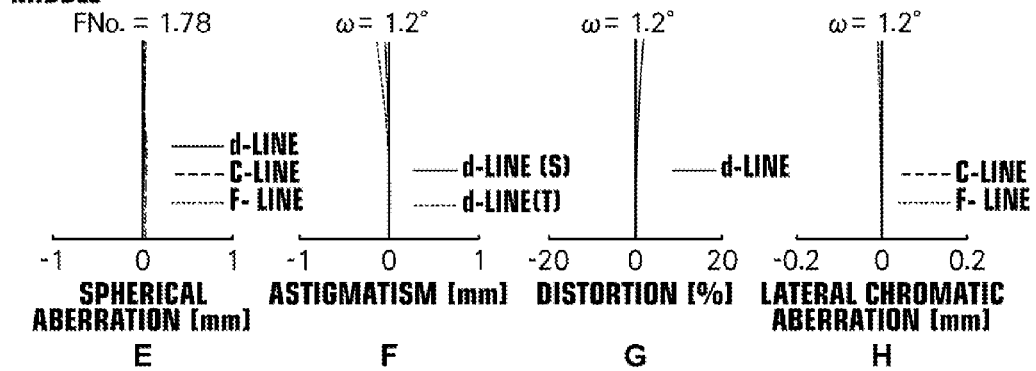
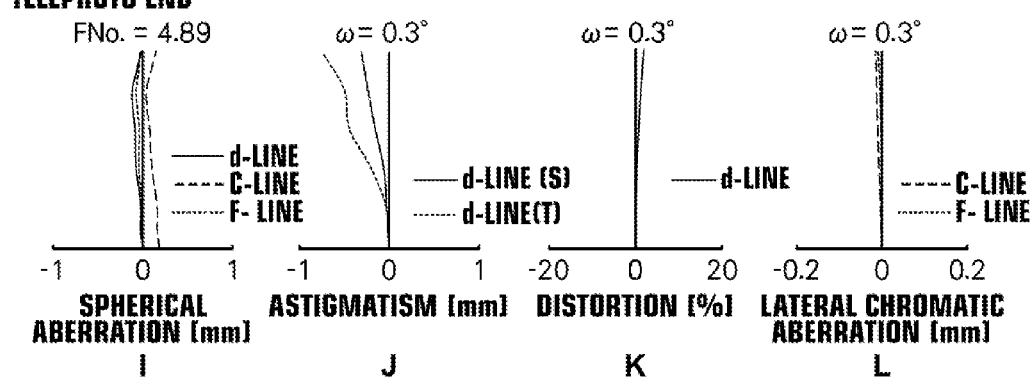

FIG.14
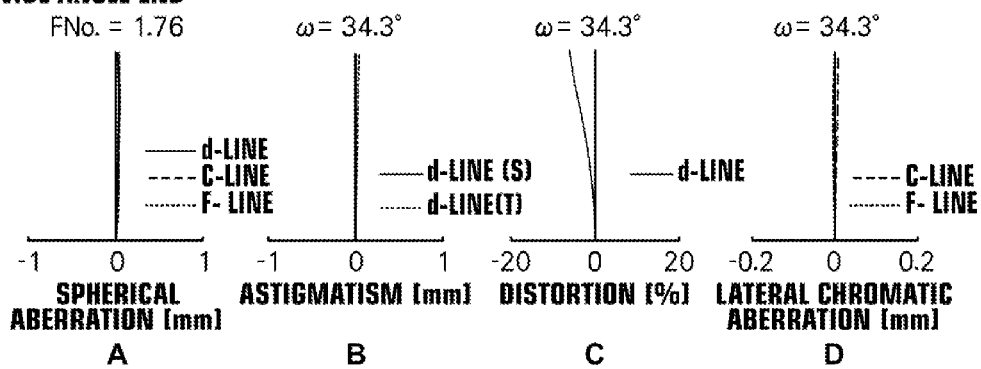
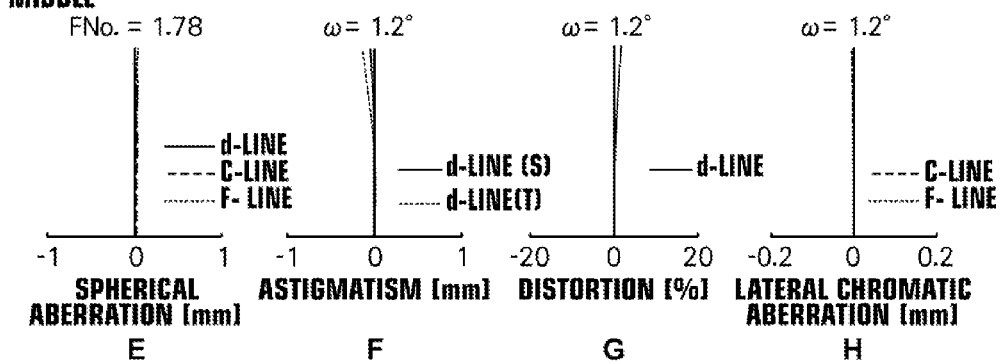
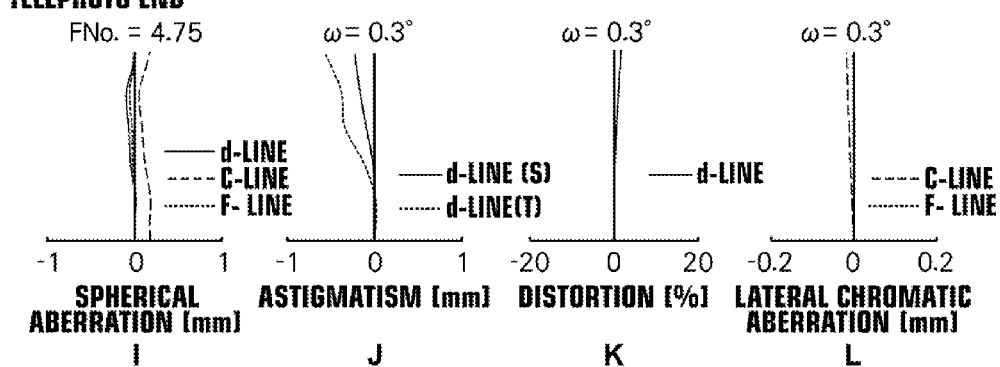

FIG.15
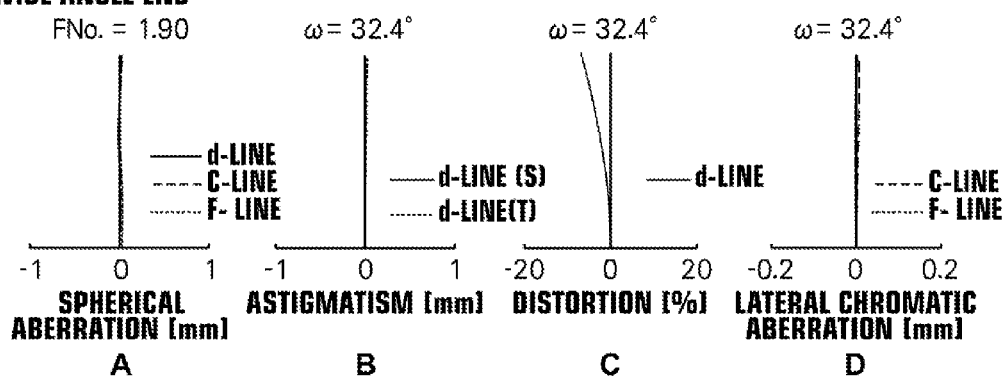
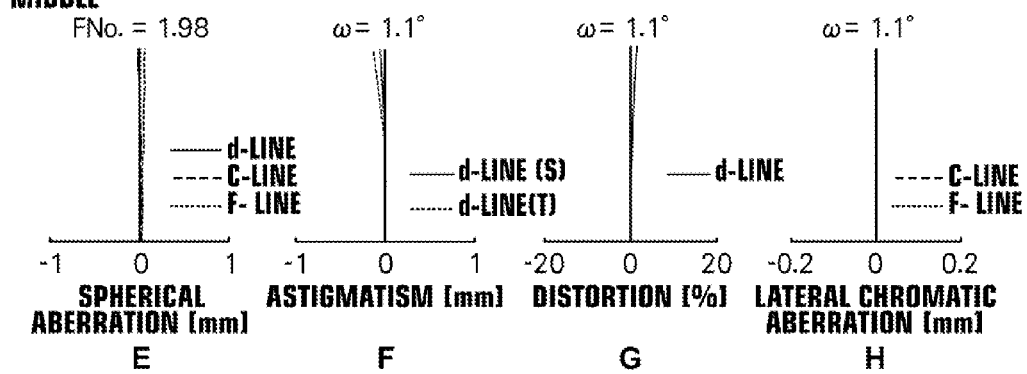
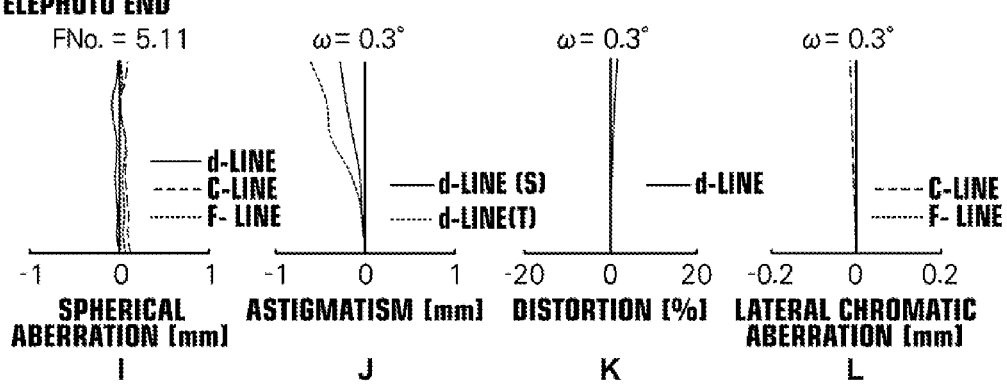

FIG.16
EXAMPLE 5
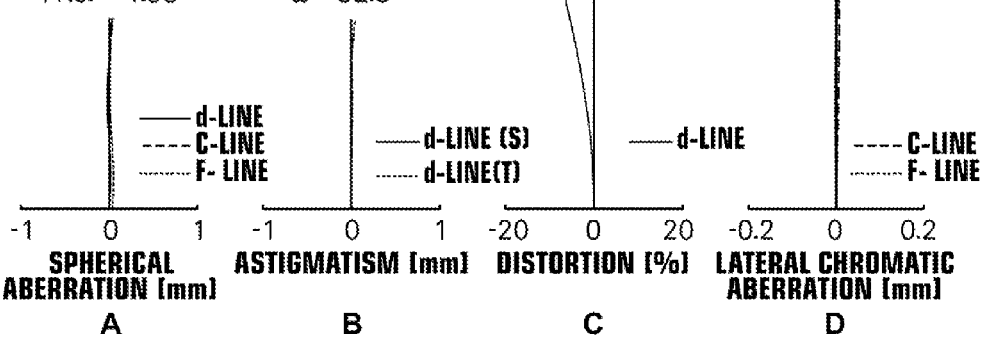
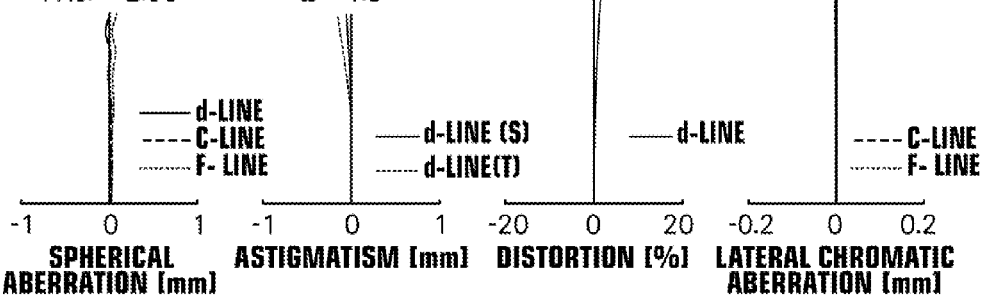
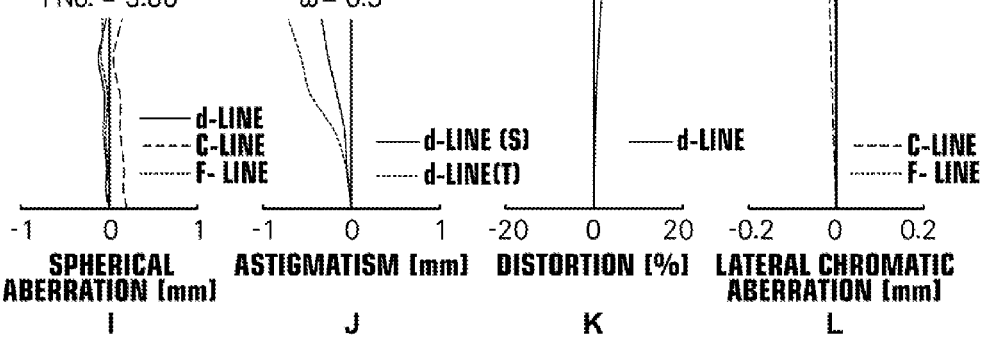

FIG.18
EXAMPLE 7
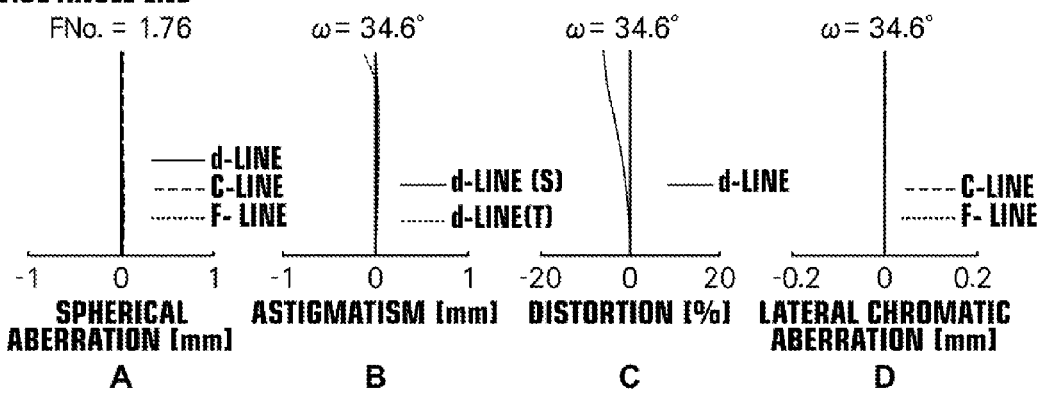
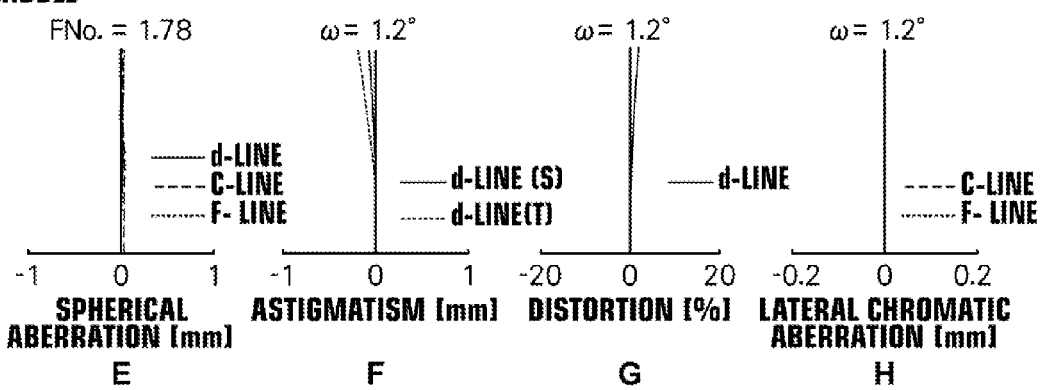
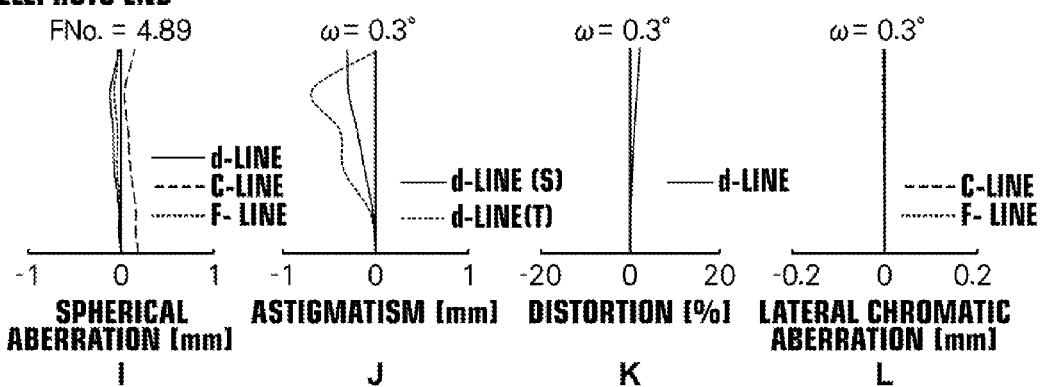

FIG.19
EXAMPLE 8
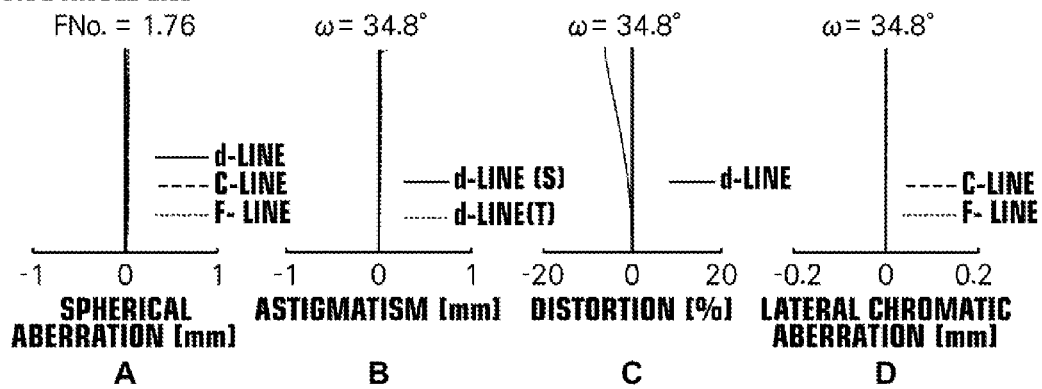
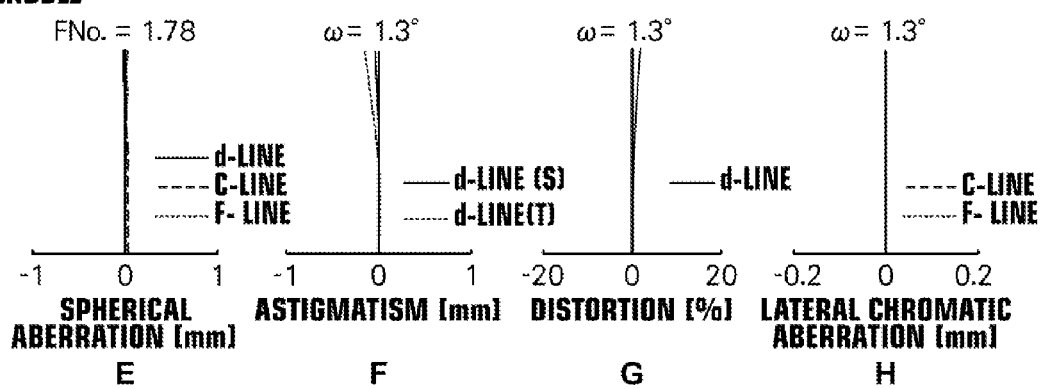
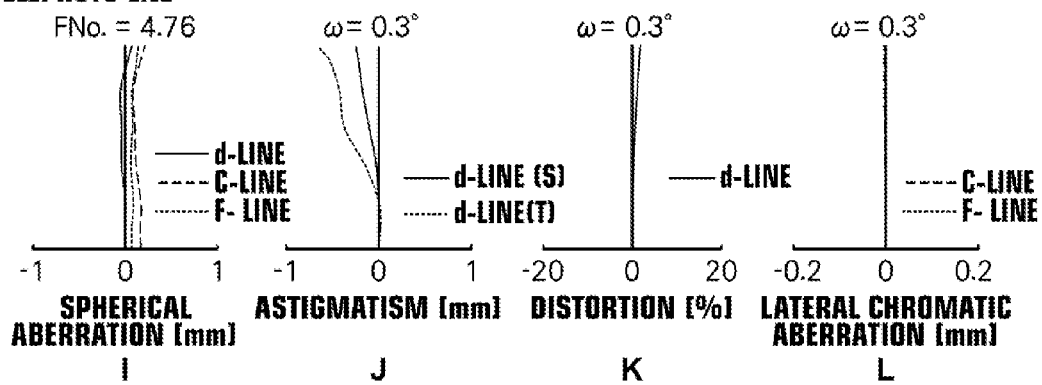

ZOOM LENS AND IMAGING APPARATUS

CROSS-REFERENCE TO RELATED APPLICATIONS

This application is a Continuation of PCT International Application No. PCT/JP2013/006453 filed on Oct. 31, 2013, which claims priority under 35 U.S.C. §119 (a) to Japanese Patent Application No. 2012-246209 filed on Nov. 8, 2012. Each of the above applications is hereby expressly incorporated by reference, in its entirety, into the present application.

BACKGROUND OF THE INVENTION

Technical Field

The present invention relates to a zoom lens with a vibration-proof function and imaging apparatus, and more specifically to a zoom lens suitable for use with a television camera and an imaging apparatus equipped with the zoom lens.

Background Art

Zoom lenses are more susceptible to vibrations and camera shakes as the magnification is increased and the focal length on the telephoto side becomes longer, so that a vibration-proof function is required in order to perform imaging. As high magnification zoom lenses with vibration-proof functions for television cameras in which two lens groups are moved during zooming, those described, for example, in Japanese Unexamined Patent Publication No. 2004-110079, Japanese Unexamined Patent Publication No. 2011-242438, and Japanese Unexamined Patent Publication No. 2012-027308 have been proposed.

Example 1 of Japanese Unexamined Patent Publication No. 2004-110079 discloses a vibration-proof group composed of two lenses, a negative lens and a positive lens.

Japanese Unexamined Patent Publication No. 2011-242438 discloses a zoom lens that has achieved reduction in size and weight while disposing three lenses in a vibration-proof group by disposing a fixed group between the stop and the vibration-proof group to keep the vibration-proof group away from the stop.

Example 2 of Japanese Unexamined Patent Publication No. 2011-242438 and Japanese Unexamined Patent Publication No. 2012-027308 relate to extender group switching, and disclose a vibration-proof group composed of three lenses, a negative lens, a positive lens, and a negative lens.

SUMMARY OF INVENTION

The zoom lens described in Example 1 of Japanese Unexamined Patent Publication No. 2004-110079, however, is inadequate in optical performance during a vibration-proof operation when the focal length becomes longer because the vibration-proof group is composed of two lenses.

The zoom lens described in Japanese Unexamined Patent Publication No. 2011-242438 has a disadvantage in peripheral performance during a vibration-proof operation because the vibration-proof group is disposed at a position away from the stop, although the vibration-proof group may be downsized.

The zoom lenses described in Example 2 of Japanese Unexamined Patent Publication No. 2011-242438 and Japanese Unexamined Patent Publication No. 2012-027308 have disadvantages in color shift during a vibration-proof operation and weight reduction of the vibration-proof group because each of the two negative lenses is made of lanthanum glass.

The present invention has been developed in view of the circumstances described above, and it is an object of the present invention to provide a zoom lens having a high zoom ratio and a high optical performance with a reduced color shift even during a vibration-proof operation, and an imaging apparatus equipped with the zoom lens.

A zoom lens of the present invention consists of a first lens group having a positive refractive power and being fixed during zooming, a second lens group having a negative refractive power and being moved from the object side to the image plane side during zooming from the wide angle end to the telephoto end, a third lens group having a positive refractive power and being moved during zooming, and a fourth lens group having a positive refractive power and being fixed during zooming, in order from the object side, wherein the second lens group and the third lens group each pass through a point where the imaging magnification of each corresponding lens group is −1× at the same time during zooming from the wide angle end to the telephoto end, the fourth lens group includes, on the most object side, a vibration-proof lens group G4A which is moved in a direction perpendicular to the optical axis for vibration-proofing, the vibration-proof lens group G4A is composed of a negative lens L41, a positive meniscus lens L42 with a convex surface on the object side, and a negative lens L43, in order from the object side, and either one of the negative lens L41 and the negative lens L43 satisfies conditional expressions given below:

$$N4 < 1.68 \tag{1}$$

$$58 < \nu 4 \tag{2}$$

where N4: refractive index of the negative lens L41 or the negative lens L43, and ν4: Abbe number of the negative lens L41 or the negative lens L43.

The zoom lens of the present invention preferably satisfies a conditional expression given below:

$$2.5 < f43/f41 < 10 \tag{3}$$

where f41: focal length of the negative lens L41, and f43: focal length of the negative lens L43.

Further, the zoom lens of the present invention may include a stop between the third lens group and the fourth lens group.

Still further, the fourth lens group may include the vibration-proof lens group G4A, a lens group G4B, and a lens group G4C having an image forming effect, in order from the object side, a stop may be provided immediately before or after the vibration-proof lens group G4A, and the focal length may be extended from a normal state by switching the lens group G4B to an extender group G4B'.

Preferably, the third lens group is composed of a lens group G3A having a positive refractive power and a lens group G3B having a positive refractive power, in order from the object side, and the lens group G3A and the lens group G3B are moved independently during zooming.

Further, the zoom lens preferably satisfies conditional expressions given below:

$$N4 < 1.63 \tag{1'}$$

$$62 < \nu 4 \tag{2'}$$

Still further, the zoom lens preferably satisfies conditional expressions given below:

$$3 < f43/f41 < 9 \tag{3'}$$

An imaging apparatus of the present invention is equipped with the foregoing zoom lens of the present invention.

The zoom lens of the present invention consists of a first lens group having a positive refractive power and being fixed during zooming, a second lens group having a negative refractive power and being moved from the object side to the image plane side during zooming from the wide angle end to the telephoto end, a third lens group having a positive refractive power and being moved during zooming, and a fourth lens group having a positive refractive power and being fixed during zooming, in order from the object side, in which the second lens group and the third lens group each pass through a point where the imaging magnification of each lens group is −1× at the same time during zooming from the wide angle end to the telephoto end, the fourth lens group includes, on the most object side, a vibration-proof lens group G4A which is moved in a direction perpendicular to the optical axis for vibration-proofing, the vibration-proof lens group G4A is composed of a negative lens L41, a positive meniscus lens L42 with a convex surface on the object side, and a negative lens L43, in order from the object side, and either one of the negative lens L41 and the negative lens L43 satisfies conditional expressions given below, so that the zoom lens may have a high zoom ratio and a high optical performance with a reduced color shift even during a vibration-proof operation:

$$N4 < 1.68 \quad (1)$$

$$58 < v4 \quad (2).$$

The imaging apparatus of the present invention may obtain high quality images since the apparatus is equipped with the zoom lens of the present invention.

BRIEF DESCRIPTION OF THE DRAWINGS

FIG. 11 shows each aberration diagram (A to L) of the zoom lens of Example 1 of the present invention.

FIG. 13 shows each aberration diagram (A to L) of the zoom lens of Example 2 of the present invention.

FIG. 14 shows each aberration diagram (A to L) of the zoom lens of Example 3 of the present invention.

FIG. 15 shows each aberration diagram (A to L) of the zoom lens of Example 4 of the present invention.

FIG. 16 shows each aberration diagram (A to L) of the zoom lens of Example 5 of the present invention.

FIG. 18 shows each aberration diagram (A to L) of the zoom lens of Example 7 of the present invention.

FIG. 19 shows each aberration diagram (A to L) of the zoom lens of Example 8 of the present invention.

DESCRIPTION OF EMBODIMENTS

Figure 1:
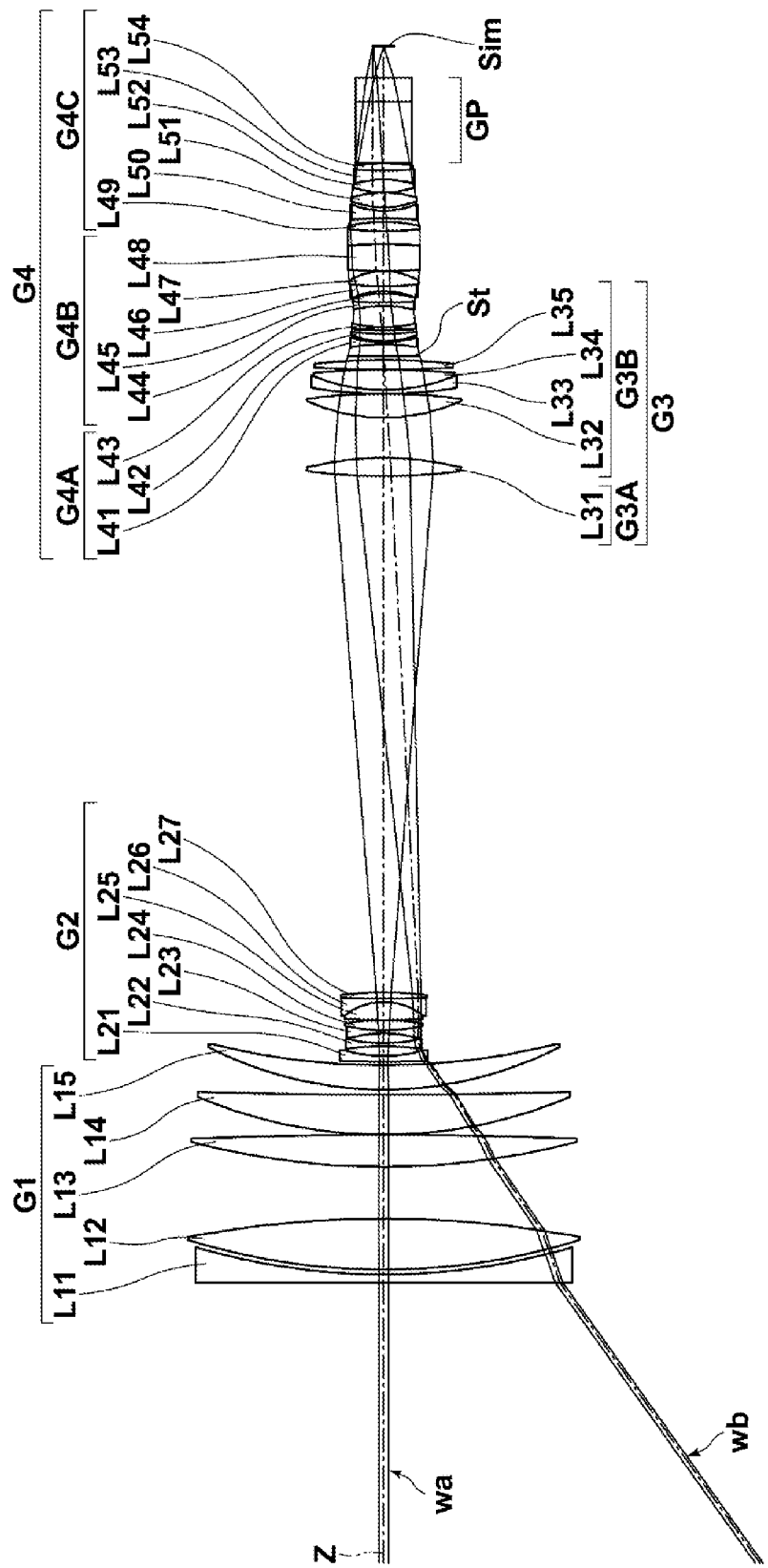
FIG. 1 is a cross-sectional view of a zoom lens according to one embodiment of the present invention (common to Example 1) at the wide angle end.
Figure 2:
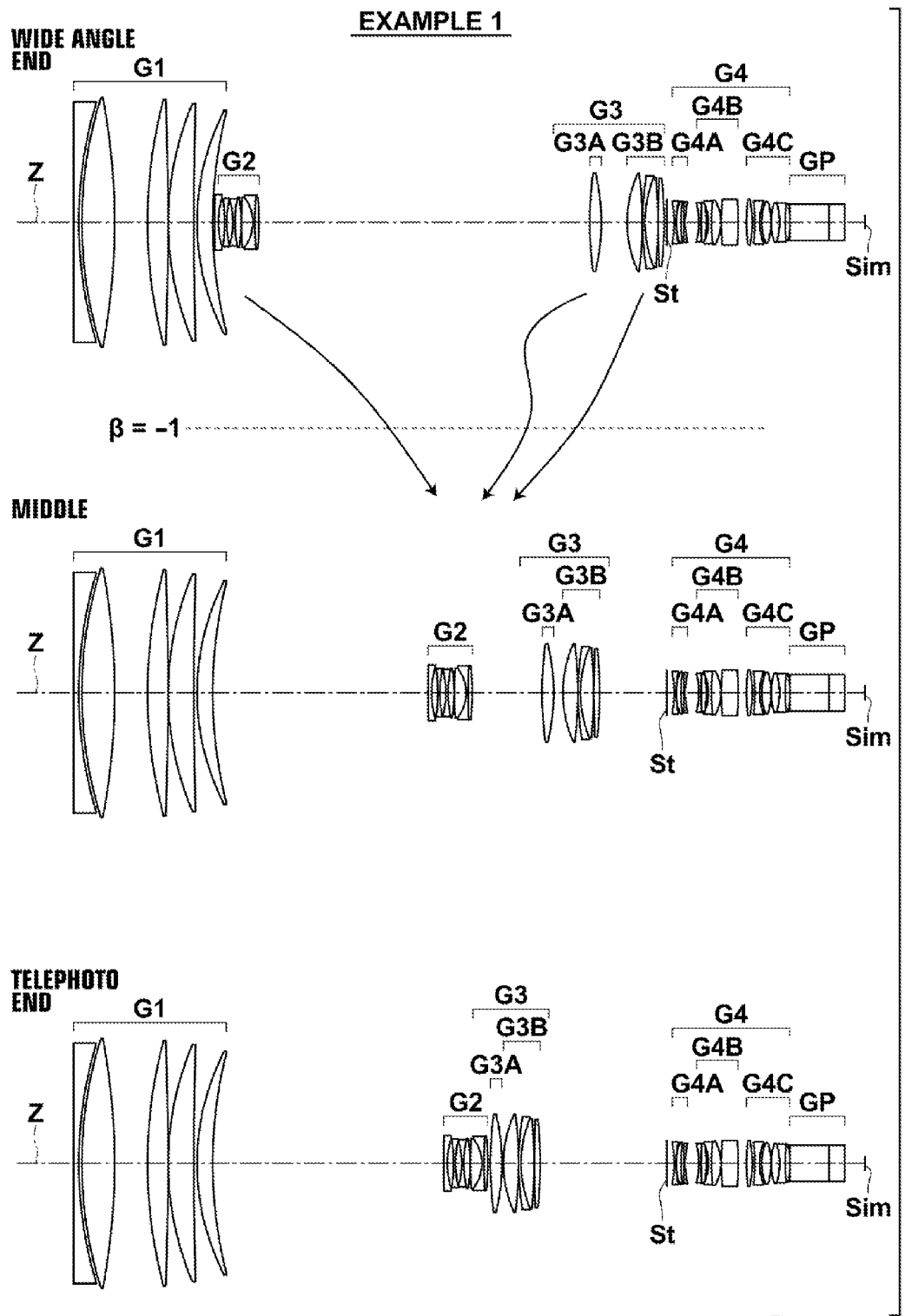
FIG. 2 is cross-sectional view of the foregoing zoom lens, illustrating a lens configuration thereof.
Figure 3:
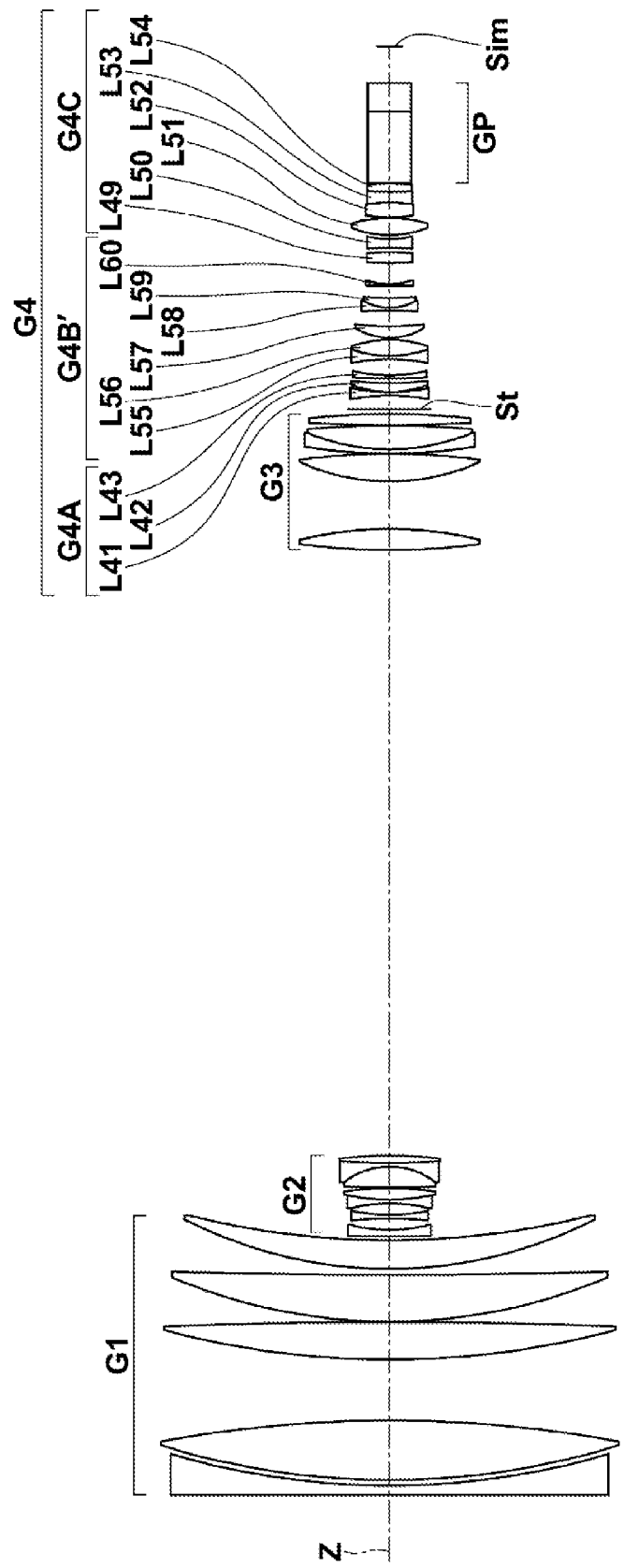
FIG. 3 is a cross-sectional view of the foregoing zoom lens at the wide angle end, illustrating a lens configuration thereof during switching to an extender group.

Hereinafter, embodiments of the present invention will be described in detail with reference to the accompanying drawings. FIG. 1 is a cross-sectional view of a zoom lens according to one embodiment of the present invention (common to Example 1) at the wide angle end, FIG. 2 is cross-sectional view of the foregoing zoom lens, illustrating a lens configuration thereof, and FIG. 3 is a cross-sectional view of the foregoing zoom lens at the wide angle end, illustrating a lens configuration thereof during switching to an extender group. Note that the configuration example shown in FIGS. 1 to 3 is common to the configuration of a zoom lens of Example 1, to be described later. In FIGS. 1 to 3, the left side is the object side and the right side is the image side. FIG. 1 also illustrates an axial light beam "wa" and a maximum angle of view light beam "wb". FIG. 2 also schematically illustrates moving trajectories of lens groups moved during zooming by the arrows below the cross-sectional view in addition to the positions where the imaging magnification of each of the second lens group G2 and the third lens group G3 is −1×.

As illustrated in FIGS. 1 and 2, the zoom lens consists of a first lens group G1 having a positive refractive power and being fixed during zooming, a second lens group G2 having a negative refractive power and being moved from the object side to the image plane side during zooming from the wide angle end to the telephoto end, a third lens group G3 having a positive refractive power and being moved during zooming, an aperture stop St, and a fourth lens group G4 having a positive refractive power and being fixed during zooming, in order from the object side along the optical axis Z. Note that the aperture stop St does not necessarily represent the size or shape but the position on the optical axis Z.

As it is preferable, in applying the zoom lens to an imaging apparatus, to dispose a cover glass, a prism, and various types of filters, such as an infrared cut filter, a low-pass filter, and the like, between the optical system and the image plane Sim according to the structure on the camera side to which the lens is attached, FIGS. 1 and 2 show an example in which a parallel plate-like optical member GP assuming these is disposed between the lens system and the image plane Sim.

The second lens group G2 and the third lens group G3 are each configured to pass through a point where the imaging magnification of each corresponding lens group is −1× at the same time during zooming from the wide angle end to the telephoto end.

The fourth lens group G4 includes, on the most object side, a vibration-proof lens group G4A which is moved in a direction perpendicular to the optical axis for vibration-proofing, and the vibration-proof lens group G4A is composed of a negative lens L41, a positive meniscus lens L42 with a convex surface on the object side, and a negative lens L43, in order from the object side, and either one of the negative lens L41 and the negative lens L43 is configured to satisfy conditional expressions given below, in which N4: refractive index of the negative lens L41 or the negative lens L43, and v4:

Abbe number of the negative lens L41 or the negative lens L43:

$$N4<1.68 \tag{1}$$

$$58<v4 \tag{2}.$$

In this way, the disposition of the first lens group G1 having a positive refractive power and being fixed during zooming, the second lens group G2 having a negative refractive power and being moved from the object side to the image plane side during zooming from the wide angle end to the telephoto end, the third lens group G3 having a positive refractive power and being moved during zooming, and the fourth lens group G4 having a positive refractive power and being fixed during zooming, in order from the object side, and the configuration of each of the second lens group G2 and the third lens group G3 to pass through a point where the imaging magnification of each corresponding lens group is −1× at the same time during zooming from the wide angle end to the telephoto end allow a high magnification zoom lens with a zoom ratio of 100× or greater to be realized while maintaining compactness.

Inclusion of a vibration-proof lens group G4A which is moved in a direction perpendicular to the optical axis for vibration-proofing on the most object side in the fourth lens group G4, and the configuration of the vibration-proof lens group G4A with a negative lens L41, a positive meniscus lens L42 with a convex surface on the object side, and a negative lens L43, in order from the object side, allow generation of aberrations during a vibration-proof operation to be suppressed.

Further, the configuration of either one of the negative lens L41 and the negative lens L43 to satisfy the conditional expressions (1) and (2) allows a color shift during a vibration-proof operation to be suppressed satisfactorily and is also advantageous for vibration proof control as the specific gravity of a material that satisfies these conditional expressions is relatively light.

In order to better suppress the color shift during a vibration-proof operation, the negative lens L43, one of the negative lenses L41 and L43, preferably satisfies the foregoing conditional expressions (1) and (2).

In a case where the zoom lens is configured to satisfy conditional expressions (1') and (2') given below, the zoom lens may have more favorable characteristics:

$$N4<1.63 \tag{1'}$$

$$62<v4 \tag{2'}.$$

The zoom lens of the present invention preferably satisfies a conditional expression (3) given below, in which f41: focal length of the negative lens L41, and f43: focal length of the negative lens L43. The satisfaction of the conditional expression (3) allows aberrations generated during a vibration-proof operation to be suppressed. If the zoom lens falls below the lower limit of the conditional expression (3), degradation in peripheral performance during a vibration-proof operation is increased. Contrary to this, if the zoom lens exceeds the upper limit of the conditional expression (3), the overall performance is degraded during a vibration-proof operation. In a case where the zoom lens is configured to satisfy a conditional expression (3') given below, the zoom lens may have more favorable characteristics:

$$2.5<f43/f41<10 \tag{3}$$

$$3<f43/f41<9 \tag{3'}.$$

The fourth lens group G4 may include the vibration-proof lens group G4A, a lens group G4B, and a lens group G4C having an image forming effect, in order from the object side, and the focal length may be extended from a normal state by switching the lens group G4B to an extender group G4B', as illustrated in FIG. 3. In this case, the position of the aperture stop St is not limited between the third lens group G3 and the fourth lens group G4, and the aperture stop St may be provided at a position immediately before or after the vibration-proof lens group G4A. Such a configuration is advantageous for vibration-proof control since the shift amount of the vibration-proof lens group G4A for correcting the same blur angle becomes the same even when the lens group G4B is switched from the normal state to the extender group.

Preferably, the third lens group G3 is composed of a lens group G3A having a positive refractive power and a lens group G3B having a positive refractive power, in order from the object side, and the lens group G3A and the lens group G3B are moved independently during zooming. Such a configuration allows generation of aberrations due to zooming to be suppressed and a wide angle of view of 65° or more to be achieved while maintaining compactness and a high magnification.

As a specific material disposed on the most object side in the present zoom lens, glass is preferably used, or otherwise transparent ceramics may be used.

In a case where the present zoom lens is used under a severe environment, a multilayer film coating is preferably applied for protection. Further, other than the protection coating, an antireflection coating may be applied for reducing ghost light at the time of use or for similar purposes.

FIGS. 1 to 3 show an example in which the optical member GP is disposed between the lens system and the image plane Sim, but instead of disposing a low-pass filter, various filters that cut specific wavelength ranges, and the like between the lens system and the image plane Sim, foregoing various filters may be disposed between each lens or a coating having an identical effect to that of each filter may be applied to a lens surface of any lens.

Next, numerical examples of the zoom lens of the present invention will be described.

Example 1

A cross-sectional view illustrating a configuration of the zoom lens of Example 1 is shown in FIG. 2. The zoom lens of Example 1 consists of a first lens group G1 having a positive refractive power, a second lens group G2 having a negative refractive power, a third lens group G3 having a positive refractive power, and a fourth lens group G4 having a positive refractive power, in order from the object side. An aperture stop St is disposed between the third lens group G3 and the fourth lens group G4. Note that the aperture stop St shown in FIG. 2 does not represent the size or shape but the position on the optical axis. FIG. 2 shows an example in which an optical member GP assuming various types of filters, a cover glass, and the like is disposed between the fourth lens group G4 and the image plane Sim.

The zoom lens is configured such that the first lens group G1 and the fourth lens group G4 are fixed with respect to the image plane Sim, while the second lens group G2 and the third lens group G3 are moved along the optical axis Z during zooming from the wide angle end to the telephoto end. Further, the zoom lens is configured such that the second lens group G2 and the third lens group G3 each pass through a point where the imaging magnification of each corresponding lens group is −1× at the same time during zooming from the wide angle end to the telephoto end.

The first lens group G1 consists of five lenses, composed of lenses L11 to L15, in order from the object side.

The second lens group G2 consists of seven lenses, composed of lenses L21 to L27, in order from the object side.

The third lens group G3 is composed of a lens group G3A having a positive refractive power and a lens group G3B having a positive refractive power, in order from the object side. The lens group G3A is composed of a lens L31 and the lens group G3B consists of four lenses, composed of lenses L32 to L35, in order from the object side. The lens group G3A and the lens group G3B are configured to be moved independently during zooming from the wide angle end to the telephoto end.

The fourth lens group G4 consists of a vibration-proof lens group G4A, a lens group G4B, and a lens group G4C having an image forming effect, in order from the object side. The vibration-proof lens group G4A consists of three lenses, composed of lenses L41 to L43, the lens group G4B consists of five lenses, composed of lenses L44 to L48, and the lens group G4C consists of six lenses, composed of lenses L49 to L54. Further, the fourth lens group G4 is configured such that the focal length is extendable from a normal state by switching the lens group G4B to an extender group G4B'.

Basic lens data, specification data, zoom spacing data, and aspherical surface coefficient data of the zoom lens of Example 1 are shown in Tables 1 to 4 respectively. Further, lens data and specification data of the zoom lens of Example 1 when switched to the extender group are shown in Tables 5 and 6 respectively. Note that Table 5 shows only the extender group and two lenses before and after the extender group. Meanings of the symbols used in the tables will be described below by taking those used in Example 1 as example, but basically the same applies to Examples 2 to 8.

In the lens data in Table 1 and Table 5, the Si column indicates the $i^{th}$ surface number in which a number i (i=1, 2, 3, - - - ) is given to each surface in a serially increasing manner toward the image side with the object side surface of the most object side constituent element being taken as the first surface. The Ri column indicates the radius of curvature of the $i^{th}$ surface and the Di column indicates the surface distance on the optical axis Z between the $i^{th}$ surface and the $(i+1)^{th}$ surface. The Ndj column indicates the refractive index of the $j^{th}$ optical element with respect to the d-line (wavelength of 587.6 nm) in which a number j (j=1, 2, 3, - - - ) is given to each constituent element in a serially increasing manner toward the image side with the most object side constituent element being taken as the first element, and the vdj column indicates the Abbe number of the $j^{th}$ optical element with respect to the d-line (wavelength of 587.6 nm).

The sign of the radius of curvature is positive if the surface shape is convex on the object side and negative if it is convex on the image side. Note that the aperture stop St and the optical member GP are also included in the basic lens data. The surface number column corresponding to the aperture stop St includes the word (Stop) in addition to the surface number. Further, the surface distance column of each surface distance that varies during zooming includes DD[i].

The specification data in Table 2 show values of zoom magnification, focal length f', back focus BF', F-number FNo., and total angle of view 2ω.

In basic lens data and specification data, degree is used as the unit of angle, and mm is used as the unit of length. But, these are only examples and other appropriate units may also be used, as optical systems can be used by proportionally enlarged or reduced.

In the lens data of Table 1, a mark "*" is attached to the surface number of an aspherical surface and a numerical value of the paraxial radius of curvature is indicated as the radius of curvature of the aspherical surface. The aspherical surface coefficient data in Table 4 show the surface numbers Si of aspherical surfaces and aspherical surface coefficients of these aspherical surfaces. The aspherical surface coefficients are the values of each of coefficients KA and Am (m=3, 4, 5, - - - , and 20) in an aspherical surface expression represented by a formula (A) given below. The "E+n" (n: integer) and "E−n" (n: integer) in the values of aspherical surface coefficients refers to "×10$^{+n}$" and "×10$^{-n}$" respectively.

$$Zd = C \cdot h^2 / \{1 + (1 - KA \cdot C^2 \cdot h^2)^{1/2}\} + \Sigma Am \cdot h^m \quad (A)$$

where,

Zd: depth of aspherical surface (length of vertical line extended from a point on the aspherical surface at height h to a flat surface orthogonal to the optical axis to which the aspherical apex contacts)

h: height (distance from the optical axis)

C: inverse of paraxial radius of curvature

KA, Am: aspherical surface coefficients (m=3, 4, 5, - - - , and 20).

TABLE 1

| | Example 1 • Lens Data | | | | |
|---|---|---|---|---|---|
| | Si (Surface No.) | Ri (Radius of Curvature) | Di (Surface Distance) | Ndj (Refractive Index) | vdj (Abbe Number) |
| G1 | 1 | ∞ | 4.40 | 1.80610 | 40.92 |
| | 2 | 330.4096 | 2.57 | | |
| | 3 | 329.5402 | 27.55 | 1.43387 | 95.20 |
| | 4 | −526.4973 | 28.00 | | |
| | 5 | 375.0501 | 17.34 | 1.43387 | 95.20 |
| | 6 | −2354.5792 | 0.15 | | |
| | 7 | 238.2325 | 21.57 | 1.43387 | 95.20 |
| | 8 | 3051.7004 | 2.77 | | |
| | 9 | 192.5230 | 13.12 | 1.43875 | 94.93 |
| | 10 | 352.7548 | DD[10] | | |
| G2 | *11 | 2005.3962 | 3.00 | 2.00069 | 25.46 |
| | 12 | 65.6378 | 5.24 | | |
| | 13 | −154.1485 | 1.70 | 2.00100 | 29.13 |
| | 14 | 79.2747 | 5.29 | | |
| | 15 | −65.5606 | 1.70 | 1.81600 | 46.62 |
| | 16 | 85.6905 | 5.35 | 1.80809 | 22.76 |
| | 17 | −120.1794 | 0.15 | | |
| | 18 | 354.1391 | 9.75 | 1.80809 | 22.76 |
| | 19 | −31.9486 | 1.70 | 1.88300 | 40.76 |
| | 20 | 332.2957 | 3.52 | 1.43875 | 94.93 |
| | 21 | −165.9269 | DD[21] | | |
| G3 | 22 | 293.3434 | 9.77 | 1.59282 | 68.63 |
| | *23 | −154.2413 | DD[23] | | |
| | 24 | 93.3735 | 12.76 | 1.43875 | 94.93 |
| | 25 | −291.5741 | 0.12 | | |
| | 26 | 223.7753 | 2.00 | 1.84661 | 23.78 |
| | 27 | 92.2094 | 10.92 | 1.43875 | 94.93 |
| | 28 | −391.1101 | 0.12 | | |
| | *29 | 414.8578 | 5.20 | 1.43875 | 94.93 |
| | 30 | −310.7480 | DD[30] | | |
| | 31 (Stop) | ∞ | 6.28 | | |

TABLE 1-continued

Example 1 • Lens Data

|  | Si (Surface No.) | Ri (Radius of Curvature) | Di (Surface Distance) | Ndj (Refractive Index) | vdj (Abbe Number) |
|---|---|---|---|---|---|
| G4A | 32 | −92.5540 | 1.50 | 1.77250 | 49.60 |
|  | 33 | 76.0635 | 0.12 |  |  |
|  | 34 | 44.5714 | 4.09 | 1.80518 | 25.42 |
|  | 35 | 118.5943 | 2.15 |  |  |
|  | 36 | 240.0932 | 1.50 | 1.48749 | 70.23 |
|  | 37 | 67.1009 | 11.57 |  |  |
| G4B | 38 | −58.0876 | 1.80 | 1.80400 | 46.58 |
|  | 39 | 287.8677 | 4.68 | 1.80518 | 25.43 |
|  | 40 | −59.6298 | 1.43 |  |  |
|  | 41 | −37.8826 | 2.60 | 1.88300 | 40.76 |
|  | 42 | 153.7057 | 8.14 | 1.51633 | 64.14 |
|  | 43 | −35.1140 | 0.16 |  |  |
|  | 44 | 247.5089 | 14.33 | 1.77250 | 49.60 |
|  | 45 | −331.6162 | 7.20 |  |  |
| G4C | 46 | 172.1905 | 4.98 | 1.80400 | 46.58 |
|  | 47 | −80.4143 | 1.94 |  |  |
|  | 48 | −162.6794 | 4.01 | 1.88300 | 40.76 |
|  | 49 | 42.1065 | 1.80 |  |  |
|  | 50 | 43.4997 | 7.96 | 1.51633 | 64.14 |
|  | 51 | −55.5532 | 0.12 |  |  |
|  | 52 | 51.2750 | 6.99 | 1.48749 | 70.23 |
|  | 53 | −53.1082 | 4.87 | 1.88300 | 40.76 |
|  | 54 | 151.3961 | 3.97 | 1.51633 | 64.14 |
|  | 55 | −94.9653 | 0.00 |  |  |
|  | 56 | ∞ | 33.00 | 1.60863 | 46.60 |
|  | 57 | ∞ | 13.20 | 1.51633 | 64.14 |
|  | 58 | ∞ | 17.07 |  |  |

TABLE 2

Example 1 • Specifications (d-Line)

|  | Wide Angle | Middle | Telephoto |
|---|---|---|---|
| Zoom Ratio | 1.0 | 29.3 | 106.0 |
| f' | 8.54 | 249.96 | 905.56 |
| Bf' | 46.29 | 46.29 | 46.29 |
| FNo. | 1.76 | 1.76 | 4.74 |
| 2ω[°] | 69.0 | 2.4 | 0.6 |

TABLE 3

Example 1 • Zoom Spacing

|  | | | |
|---|---|---|---|
| DD[10] | 1.80 | 181.74 | 195.04 |
| DD[21] | 279.08 | 58.93 | 2.00 |
| DD[23] | 21.81 | 7.71 | 1.21 |
| DD[30] | 2.16 | 56.47 | 106.60 |

TABLE 4

Example 1 • Aspherical surface Coefficients

| Si | 11 | 23 | 29 |
|---|---|---|---|
| KA | 3.3621357E+03 | −4.5249977E+00 | −4.1672124E+02 |
| A3 | 1.2176884E−06 | 4.9148310E−07 | 4.3993104E−07 |
| A4 | −4.4367027E−07 | −5.4037884E−08 | 6.8643652E−07 |
| A5 | 4.0281394E−07 | 6.0320541E−09 | −6.1482862E−08 |
| A6 | −1.0642696E−07 | −4.1064829E−09 | 4.4465955E−09 |
| A7 | 2.0676911E−08 | 6.8504995E−10 | −2.3813209E−10 |
| A8 | −2.7162609E−09 | −6.3044711E−11 | 2.8351153E−12 |
| A9 | 2.1012674E−10 | 3.4636414E−12 | 3.2389709E−13 |
| A10 | −6.6281386E−12 | −1.0055016E−13 | −9.8721207E−15 |
| A11 | −2.2020016E−13 | 5.2190867E−16 | −2.4669326E−16 |
| A12 | 2.2835127E−14 | 5.1705646E−17 | 8.5237777E−18 |

TABLE 4-continued

Example 1 • Aspherical surface Coefficients

| Si | 11 | 23 | 29 |
|---|---|---|---|
| A13 | −3.6450229E−16 | −1.2597653E−18 | 1.0842253E−19 |
| A14 | −8.8285316E−18 | 2.3364011E−20 | 8.0665379E−21 |
| A15 | −1.5554623E−19 | −1.6161216E−21 | −6.3450229E−22 |
| A16 | 6.7209656E−21 | 5.5472793E−23 | 4.4789358E−24 |
| A17 | 1.3974813E−21 | −4.6054546E−25 | 3.2029945E−25 |
| A18 | −6.4184357E−23 | −1.3327020E−26 | −7.0043696E−27 |
| A19 | 7.8635127E−25 | 3.1886439E−28 | 4.4239674E−29 |
| A20 |  | −2.0134489E−30 | −4.9384212E−32 |

TABLE 5

Example 1 • Lens Data When Switched to Extender Group

|  | Si (Surface No.) | Ri (Radius of Curvature) | Di (Surface Distance) | Ndj (Refractive Index) | vdj (Abbe Number) |
|---|---|---|---|---|---|
|  | 36 | 240.0932 | 1.50 | 1.48749 | 70.23 |
|  | 37 | 67.1009 | 11.57 |  |  |
| G4B' | 59 | −87.2133 | 1.60 | 1.67270 | 32.10 |
|  | 60 | 48.2375 | 7.46 | 1.60311 | 60.64 |
|  | 61 | −48.2375 | 0.99 |  |  |
|  | 62 | 27.7784 | 5.38 | 1.48749 | 70.23 |
|  | 63 | 136.3269 | 7.23 |  |  |
|  | 64 | −169.0193 | 1.21 | 1.83481 | 42.73 |
|  | 65 | 21.8778 | 4.55 | 1.84666 | 23.83 |
|  | 66 | 161.8426 | 5.46 |  |  |
|  | 67 | 193.4928 | 1.00 | 1.88300 | 40.76 |
|  | 68 | 29.5423 | 9.73 |  |  |
|  | 46 | 172.1905 | 4.98 | 1.80400 | 46.58 |
|  | 47 | −80.4143 | 1.94 |  |  |

TABLE 6

Example 1 • Specifications When Switched to Extender Group (d-Line)
Extender Magnification: 1.94

|  | Wide Angle | Middle | Telephoto |
|---|---|---|---|
| f' | 16.56 | 484.55 | 1755.43 |
| FNo. | 3.42 | 3.43 | 9.16 |
| 2ω[°] | 37.4 | 1.2 | 0.4 |

Figure 12:
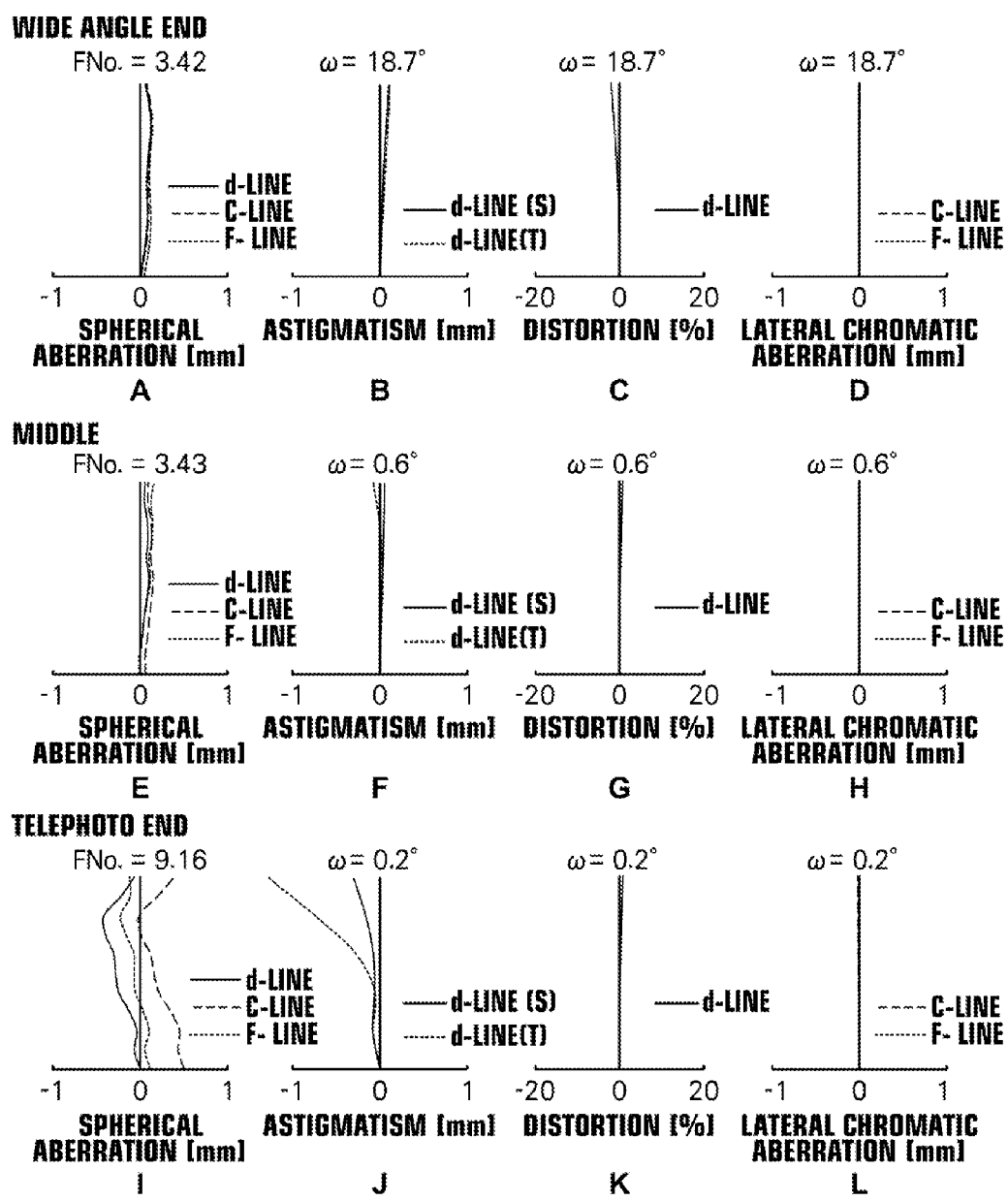
FIG. 12 shows each aberration diagram (A to L) of the zoom lens of Example 1 of the present invention during switching to the extender group.

Each aberration diagram of the zoom lens of Example 1 is shown in A to L of FIG. 11, and each aberration diagram of the zoom lens of Example 1 when switched to the extender group is shown in A to L of FIG. 12. A to L of each of FIGS. 11 and 12 show spherical aberration, astigmatism, distortion, and lateral chromatic aberration at wide angle, E to H of each of FIGS. 11 and 12 show spherical aberration, astigmatism, distortion, and lateral chromatic aberration at middle, and I to L of each of FIGS. 11 and 12 show spherical aberration, astigmatism, distortion, and lateral chromatic aberration at telephoto.

Each diagram representing spherical aberration, astigmatism, and distortion shows aberration with the d-line (wavelength 587.6 nm) as the reference wavelength. The spherical aberration diagram shows aberrations with respect to the d-line (wavelength 587.6 nm), the C-line (wavelength 656.3 nm), and the F-line (wavelength 486.1 nm) by a solid line, a long dashed line, and a short dashed line respectively. The astigmatism diagram shows aberrations in the sagittal direction and the tangential direction by a solid line and a broken line respectively. The lateral chromatic aberration diagram shows aberrations with respect to the C-line (wavelength 656.3 nm) and the F-line (wavelength 486.1 nm) by a long broken line and a short broken line respectively. The "FNo." in the diagram of spherical aberration refers to F-number and "ω" in the other aberration diagrams refers to half angle of view.

Example 2

Figure 4:
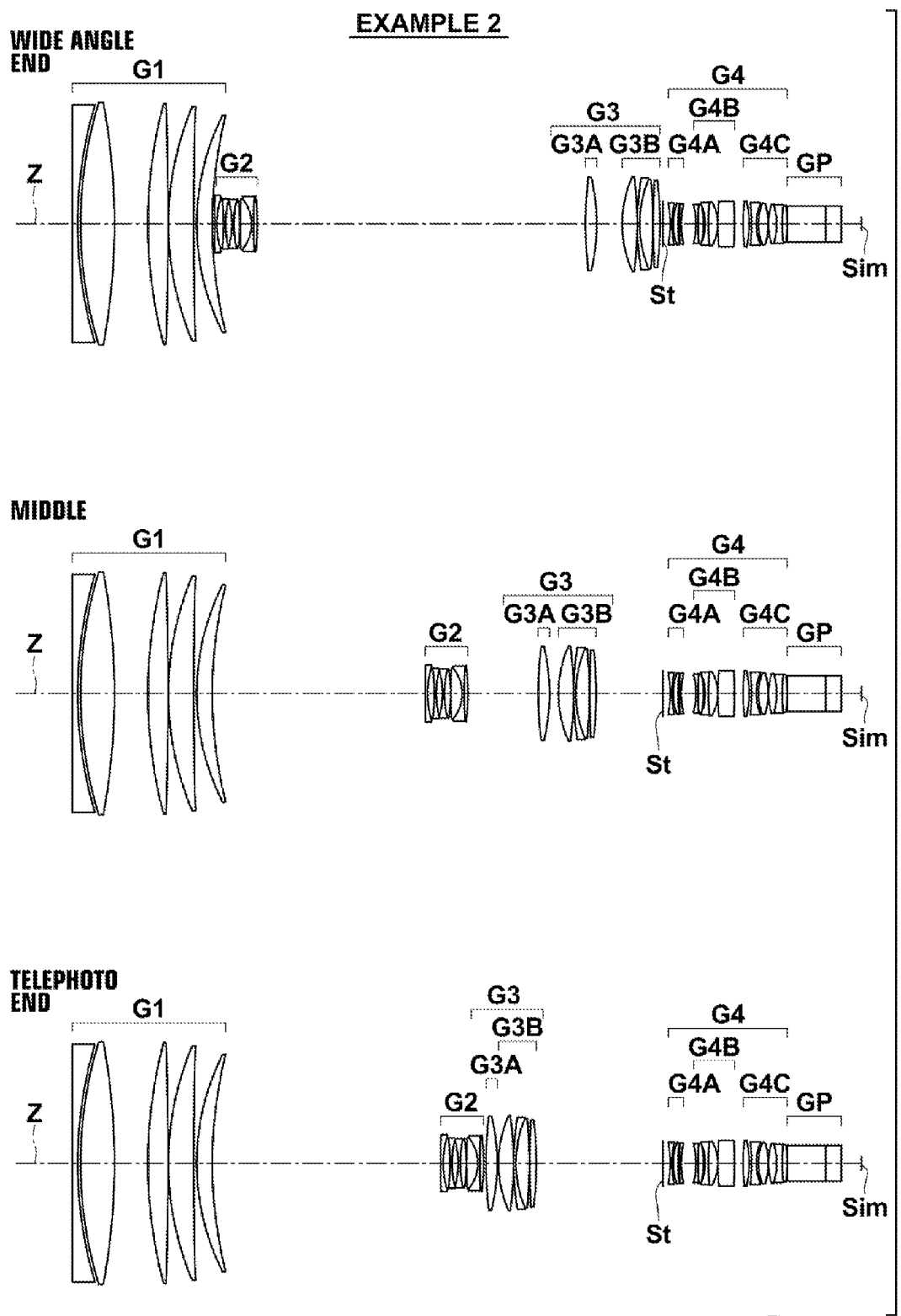
FIG. 4 is a cross-sectional view of a zoom lens of Example 2 of the present invention, illustrating a lens configuration thereof.

A cross-sectional view illustrating a lens configuration of the zoom lens of Example 2 is shown in FIG. 4. The schematic configuration of the zoom lens of Example 2 is almost the same as that of the zoom lens of Example 1 described above.

Basic lens data, specification data, zoom spacing data, and aspherical surface coefficient data of the zoom lens of Example 2 are shown in Tables 7 to 10 respectively, and each aberration diagram of the zoom lens of Example 2 is shown in A to L of FIG. 13.

TABLE 7

Example 2 • Lens Data

|  | Si (Surface No.) | Ri (Radius of Curvature) | Di (Surface Distance) | Ndj (Refractive Index) | vdj (Abbe Number) |
|---|---|---|---|---|---|
| G1 | 1 | ∞ | 4.40 | 1.80610 | 40.92 |
|  | 2 | 330.8088 | 2.53 |  |  |
|  | 3 | 330.4525 | 28.87 | 1.43387 | 95.20 |
|  | 4 | −527.5923 | 28.82 |  |  |
|  | 5 | 375.7807 | 17.31 | 1.43387 | 95.20 |
|  | 6 | −2364.5977 | 0.15 |  |  |
|  | 7 | 238.4199 | 21.57 | 1.43387 | 95.20 |
|  | 8 | 3114.8765 | 2.53 |  |  |
|  | 9 | 191.7135 | 13.30 | 1.43875 | 94.93 |
|  | 10 | 354.6727 | DD[10] |  |  |
| G2 | *11 | 2138.3058 | 2.00 | 2.00069 | 25.46 |
|  | 12 | 65.5367 | 5.94 |  |  |
|  | 13 | −152.8928 | 1.70 | 2.00100 | 29.13 |
|  | 14 | 79.6694 | 5.30 |  |  |
|  | 15 | −65.2631 | 1.70 | 1.81600 | 46.62 |
|  | 16 | 84.8742 | 5.24 | 1.80809 | 22.76 |
|  | 17 | −119.6936 | 0.15 |  |  |
|  | 18 | 354.6568 | 9.58 | 1.80809 | 22.76 |
|  | 19 | −32.3513 | 1.70 | 1.88300 | 40.76 |
|  | 20 | 340.8002 | 3.30 | 1.43875 | 94.93 |
|  | 21 | −173.8223 | DD[21] |  |  |
| G3 | 22 | 304.7747 | 9.57 | 1.59522 | 67.74 |
|  | *23 | −154.0632 | DD[23] |  |  |
|  | 24 | 93.0907 | 12.75 | 1.43875 | 94.93 |
|  | 25 | −289.4544 | 0.12 |  |  |
|  | 26 | 223.8857 | 2.00 | 1.84661 | 23.78 |
|  | 27 | 92.0001 | 11.34 | 1.43875 | 94.93 |
|  | 28 | −386.6572 | 0.27 |  |  |
|  | *29 | 414.8783 | 5.64 | 1.43875 | 94.93 |
|  | 30 | −309.2525 | DD[30] |  |  |
|  | 31 (Stop) | ∞ | 6.43 |  |  |
| G4A | 32 | −91.3741 | 1.50 | 1.77250 | 49.60 |
|  | 33 | 75.9787 | 0.99 |  |  |
|  | 34 | 44.7574 | 4.12 | 1.80518 | 25.42 |
|  | 35 | 114.1464 | 1.30 |  |  |
|  | 36 | 230.0342 | 1.50 | 1.49700 | 81.54 |
|  | 37 | 68.7975 | 12.61 |  |  |
| G4B | 38 | −58.1434 | 1.80 | 1.80400 | 46.58 |
|  | 39 | 269.2053 | 4.71 | 1.80518 | 25.43 |
|  | 40 | −59.2863 | 1.43 |  |  |
|  | 41 | −37.8944 | 2.57 | 1.88300 | 40.76 |
|  | 42 | 154.0797 | 8.13 | 1.51633 | 64.14 |
|  | 43 | −35.0860 | 0.12 |  |  |
|  | 44 | 247.5902 | 14.25 | 1.77250 | 49.60 |
|  | 45 | −330.5761 | 7.29 |  |  |
| G4C | 46 | 172.5555 | 5.15 | 1.80400 | 46.58 |
|  | 47 | −80.4140 | 2.05 |  |  |
|  | 48 | −162.4802 | 4.01 | 1.88300 | 40.76 |
|  | 49 | 42.0858 | 1.80 |  |  |
|  | 50 | 43.5438 | 8.39 | 1.51633 | 64.14 |

TABLE 7-continued

Example 2 • Lens Data

| Si (Surface No.) | Ri (Radius of Curvature) | Di (Surface Distance) | Ndj (Refractive Index) | vdj (Abbe Number) |
|---|---|---|---|---|
| 51 | −55.5839 | 0.14 |  |  |
| 52 | 52.0967 | 7.07 | 1.48749 | 70.23 |
| 53 | −53.1324 | 4.87 | 1.88300 | 40.76 |
| 54 | 164.0877 | 4.06 | 1.51633 | 64.14 |
| 55 | −95.5253 | 0.00 |  |  |
| 56 | ∞ | 33.00 | 1.60863 | 46.60 |
| 57 | ∞ | 13.20 | 1.51633 | 64.14 |
| 58 | ∞ | 17.27 |  |  |

TABLE 8

Example 2 • Specifications (d-Line)

|  | Wide Angle | Middle | Telephoto |
|---|---|---|---|
| Zoom Ratio | 1.0 | 29.5 | 109.9 |
| f' | 8.49 | 250.80 | 933.46 |
| Bf' | 46.49 | 46.49 | 46.49 |
| FNo. | 1.76 | 1.78 | 4.89 |
| 2ω[°] | 69.2 | 2.4 | 0.6 |

TABLE 9

Example 2 • Zoom Spacing

|  | | | |
|---|---|---|---|
| DD[10] | 1.78 | 181.61 | 194.98 |
| DD[21] | 280.03 | 59.92 | 1.96 |
| DD[23] | 21.76 | 7.66 | 1.16 |
| DD[30] | 2.32 | 56.69 | 107.79 |

TABLE 10

Example 2 • Aspherical surface Coefficients

| Si | 11 | 23 | 29 |
|---|---|---|---|
| KA | 1.0000000E+00 | −4.5249977E+00 | −4.1672124E+02 |
| A3 | 1.3227001E−06 | 5.0342389E−07 | 4.5408707E−07 |
| A4 | −4.1551577E−07 | −5.4420598E−08 | 6.8862006E−07 |
| A5 | 4.0346676E−07 | 6.0701554E−09 | −6.1459074E−08 |
| A6 | −1.0639918E−07 | −4.1047966E−09 | 4.4463000E−09 |
| A7 | 2.0677579E−08 | 6.8507739E−10 | −2.3815763E−10 |
| A8 | −2.7162738E−09 | −6.3046685E−11 | 2.8347766E−12 |
| A9 | 2.1012515E−10 | 3.4635479E−12 | 3.2392695E−13 |
| A10 | −6.6281987E−12 | −1.0055196E−13 | −9.8695920E−15 |
| A11 | −2.2020125E−13 | 5.2196375E−16 | −2.4657815E−16 |
| A12 | 2.2835149E−14 | 5.1711690E−17 | 8.5271076E−18 |
| A13 | −3.6449899E−16 | −1.2594843E−18 | 1.0844769E−19 |
| A14 | −8.8283386E−18 | 2.3367765E−20 | 8.0626086E−21 |
| A15 | −1.5553791E−19 | −1.6167005E−21 | −6.3478780E−22 |
| A16 | 6.7212726E−21 | 5.5436618E−23 | 4.4685512E−24 |
| A17 | 1.3974922E−21 | −4.5811352E−25 | 3.2018932E−25 |
| A18 | −6.4183948E−23 | −1.3385980E−26 | −6.9880758E−27 |
| A19 | 7.8636825E−25 | 3.1975144E−28 | 4.4700237E−29 |
| A20 |  | −2.0203349E−30 | −6.3034703E−32 |

Example 3

Figure 5:
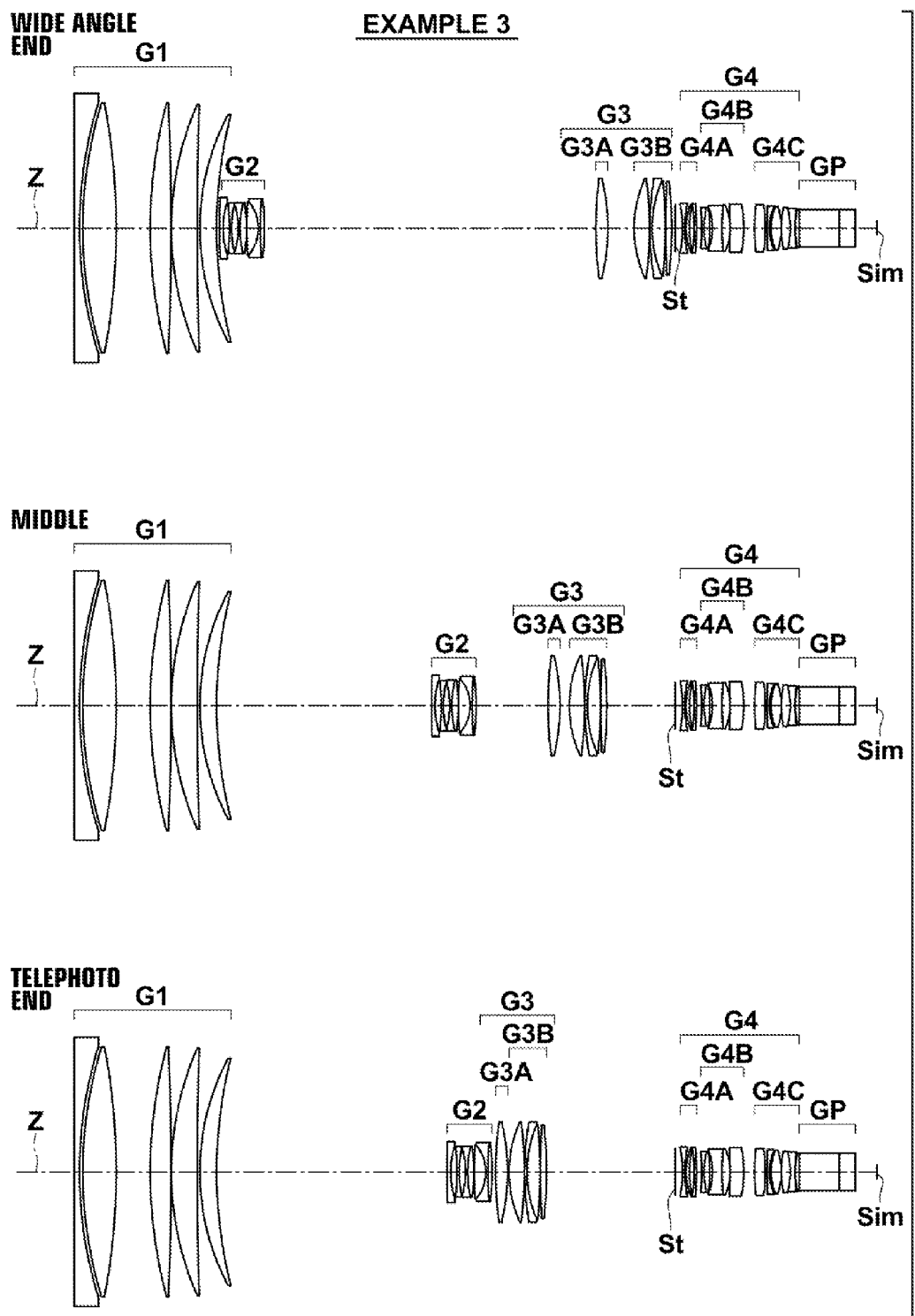
FIG. 5 is a cross-sectional view of a zoom lens of Example 3 of the present invention, illustrating a lens configuration thereof.

A cross-sectional view illustrating a lens configuration of the zoom lens of Example 3 is shown in FIG. 5. The schematic configuration of the zoom lens of Example 3 is almost the same as that of the zoom lens of Example 1 described above.

Basic lens data, specification data, zoom spacing data, and aspherical surface coefficient data of the zoom lens of Example 3 are shown in Tables 11 to 14 respectively, and each aberration diagram of the zoom lens of Example 3 is shown in A to L of FIG. 14.

TABLE 11

Example 3 • Lens Data

|  | Si (Surface No.) | Ri (Radius of Curvature) | Di (Surface Distance) | Ndj (Refractive Index) | vdj (Abbe Number) |
|---|---|---|---|---|---|
| G1 | 1 | ∞ | 4.40 | 1.80610 | 40.92 |
|  | 2 | 330.2432 | 2.74 |  |  |
|  | 3 | 329.0564 | 27.63 | 1.43387 | 95.20 |
|  | 4 | −523.2689 | 28.42 |  |  |
|  | 5 | 375.3508 | 17.32 | 1.43387 | 95.20 |
|  | 6 | −2369.9337 | 0.15 |  |  |
|  | 7 | 238.1740 | 21.54 | 1.43387 | 95.20 |
|  | 8 | 2957.3815 | 2.11 |  |  |
|  | 9 | 187.6246 | 13.91 | 1.43875 | 94.93 |
|  | 10 | 355.8756 | DD[10] |  |  |
| G2 | *11 | 2009.1027 | 3.00 | 2.00069 | 25.46 |
|  | 12 | 64.8352 | 5.31 |  |  |
|  | 13 | −153.7976 | 1.70 | 2.00100 | 29.13 |
|  | 14 | 78.5585 | 5.34 |  |  |
|  | 15 | −64.9986 | 1.70 | 1.81600 | 46.62 |
|  | 16 | 85.8120 | 5.35 | 1.80809 | 22.76 |
|  | 17 | −121.5185 | 0.15 |  |  |
|  | 18 | 373.3074 | 9.61 | 1.80809 | 22.76 |
|  | 19 | −32.3230 | 1.70 | 1.88300 | 40.76 |
|  | 20 | 346.0700 | 3.40 | 1.43875 | 94.93 |
|  | 21 | −180.2335 | DD[21] |  |  |
| G3 | 22 | 292.4479 | 9.95 | 1.59282 | 68.63 |
|  | *23 | −153.8499 | DD[23] |  |  |
|  | 24 | 94.0952 | 12.71 | 1.43875 | 94.93 |
|  | 25 | −291.4572 | 0.12 |  |  |
|  | 26 | 221.2826 | 2.00 | 1.84661 | 23.78 |
|  | 27 | 93.0370 | 10.93 | 1.43875 | 94.93 |
|  | 28 | −378.3589 | 0.14 |  |  |
|  | *29 | 417.7491 | 5.20 | 1.43875 | 94.93 |
|  | 30 | −305.7029 | DD[30] |  |  |
|  | 31 (Stop) | ∞ | 6.23 |  |  |
| G4A | 32 | −88.7375 | 1.80 | 1.77250 | 49.60 |
|  | 33 | 88.7375 | 0.95 |  |  |
|  | 34 | 46.8482 | 2.98 | 1.80809 | 22.76 |
|  | 35 | 81.2815 | 3.83 |  |  |
|  | 36 | −115.3087 | 2.08 | 1.61800 | 63.33 |
|  | 37 | −198.2067 | 4.26 |  |  |
| G4B | 38 | −143.1369 | 1.80 | 1.80400 | 46.58 |
|  | 39 | 61.7326 | 4.78 | 1.80518 | 25.43 |
|  | 40 | −129.7741 | 2.21 |  |  |
|  | 41 | −44.6982 | 8.00 | 1.88300 | 40.76 |
|  | 42 | 172.8056 | 6.67 | 1.58913 | 61.14 |
|  | 43 | −43.9591 | 0.12 |  |  |
|  | 44 | −204.9801 | 11.22 | 1.77250 | 49.60 |
|  | 45 | −110.1406 | 9.03 |  |  |
| G4C | 46 | 144.2910 | 8.86 | 1.58913 | 61.14 |
|  | 47 | −144.2910 | 1.50 |  |  |
|  | 48 | 321.0441 | 2.00 | 1.88300 | 40.76 |
|  | 49 | 40.3954 | 1.30 |  |  |
|  | 50 | 41.3868 | 8.53 | 1.51633 | 64.14 |
|  | 51 | −54.1613 | 0.12 |  |  |
|  | 52 | 82.4164 | 7.32 | 1.51633 | 64.14 |
|  | 53 | −55.8520 | 3.88 | 1.88300 | 40.76 |
|  | 54 | 143.7455 | 0.20 |  |  |
|  | 55 | 68.8983 | 3.66 | 1.48749 | 70.23 |
|  | 56 | −223.4807 | 0.00 |  |  |
|  | 57 | ∞ | 33.00 | 1.60863 | 46.60 |
|  | 58 | ∞ | 13.20 | 1.51633 | 64.14 |
|  | 59 | ∞ | 17.91 |  |  |

TABLE 12

Example 3 • Specifications (d-Line)

|  | Wide Angle | Middle | Telephoto |
|---|---|---|---|
| Zoom Ratio | 1.0 | 29.0 | 105.9 |
| f' | 8.58 | 248.58 | 909.05 |
| Bf' | 47.13 | 47.13 | 47.13 |
| FNo. | 1.76 | 1.78 | 4.75 |
| 2ω[°] | 68.6 | 2.4 | 0.6 |

TABLE 13

Example 3 • Zoom Spacing

| DD[10] | 2.39 | 178.03 | 191.08 |
| DD[21] | 274.72 | 59.46 | 3.00 |
| DD[23] | 21.82 | 7.72 | 1.22 |
| DD[30] | 2.79 | 56.51 | 106.42 |

TABLE 14

Example 3 • Aspherical surface Coefficients

| Si | 11 | 23 | 29 |
|---|---|---|---|
| KA | 3.3621357E+03 | −4.5249977E+00 | −4.1672124E+02 |
| A3 | 1.1238908E−06 | 3.9718407E−07 | 2.0947716E−07 |
| A4 | −4.3960025E−07 | −5.4535585E−08 | 6.8512791E−07 |
| A5 | 4.0363327E−07 | 5.9958141E−09 | −6.1562695E−08 |
| A6 | −1.0644984E−07 | −4.1044204E−09 | 4.4406201E−09 |
| A7 | 2.0674918E−08 | 6.8505897E−10 | −2.3831978E−10 |
| A8 | −2.7163017E−09 | −6.3048957E−11 | 2.8307483E−12 |
| A9 | 2.1012867E−10 | 3.4633915E−12 | 3.2383366E−13 |
| A10 | −6.6279291E−12 | −1.0055759E−13 | −9.8708052E−15 |
| A11 | −2.2019064E−13 | 5.2184541E−16 | −2.4651234E−16 |
| A12 | 2.2835264E−14 | 5.1715109E−17 | 8.5343115E−18 |
| A13 | −3.6451604E−16 | −1.2591040E−18 | 1.0885132E−19 |
| A14 | −8.8297805E−18 | 2.3384326E−20 | 8.0773580E−21 |
| A15 | −1.5559886E−19 | −1.6161103E−21 | −6.3458666E−22 |
| A16 | 6.7199372E−21 | 5.5435135E−23 | 4.4531606E−24 |
| A17 | 1.3975047E−21 | −4.6210501E−25 | 3.1910790E−25 |
| A18 | −6.4181502E−23 | −1.3270463E−26 | −7.0129246E−27 |
| A19 | 7.8647891E−25 | 3.1921471E−28 | 4.6948138E−29 |
| A20 |  | −2.0273111E−30 | −8.9083703E−32 |

Example 4

Figure 6:
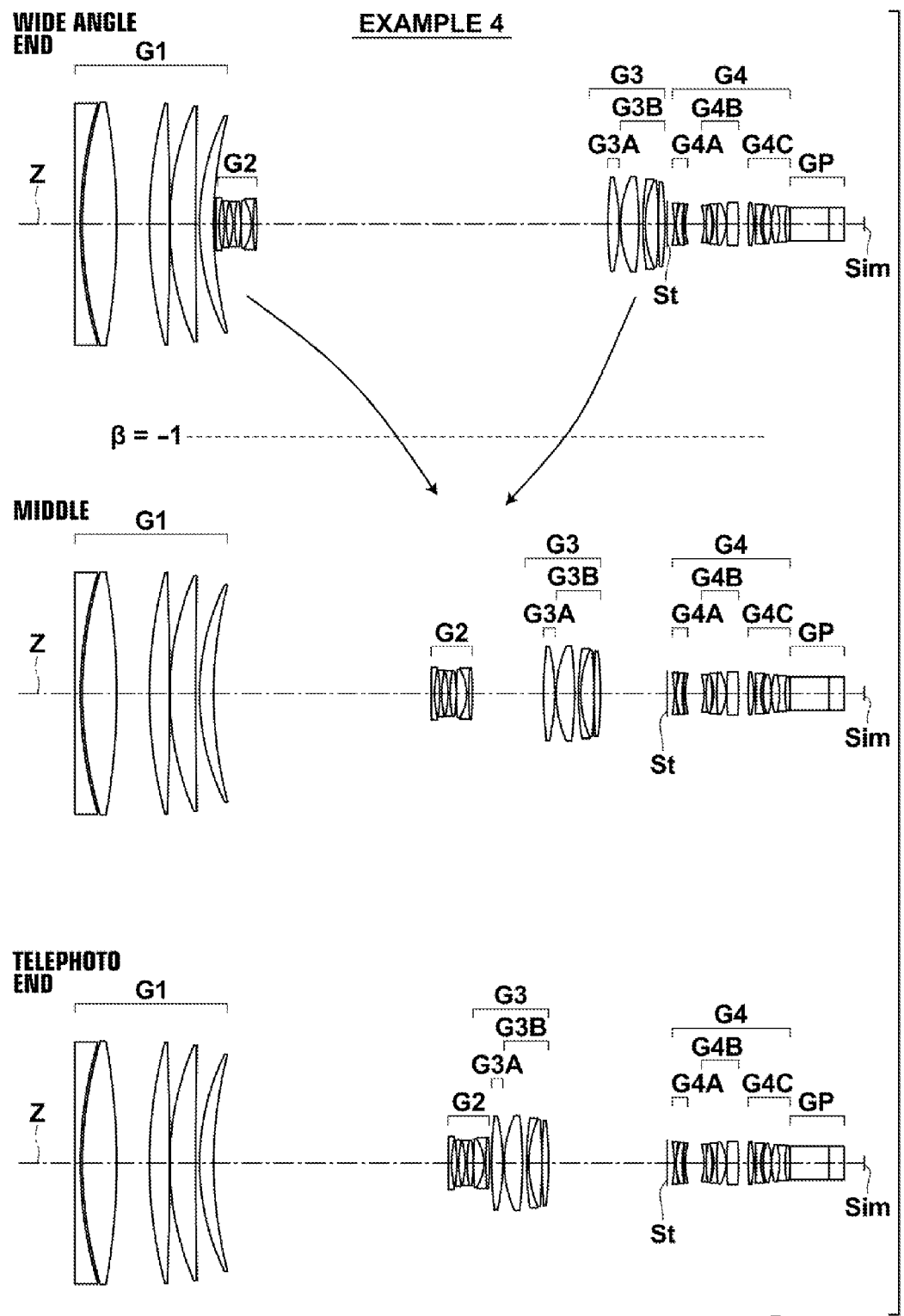
FIG. 6 is a cross-sectional view of a zoom lens of Example 4 of the present invention, illustrating a lens configuration thereof.

A cross-sectional view illustrating a lens configuration of the zoom lens of Example 4 is shown in FIG. 6. The schematic configuration of the zoom lens of Example 4 is almost the same as that of the zoom lens of Example 1 described above.

Basic lens data, specification data, zoom spacing data, and aspherical surface coefficient data of the zoom lens of Example 4 are shown in Tables 15 to 18 respectively, and each aberration diagram of the zoom lens of Example 4 is shown in A to L of FIG. 15.

TABLE 15

Example 4 • Lens Data

|  | Si (Surface No.) | Ri (Radius of Curvature) | Di (Surface Distance) | Ndj (Refractive Index) | vdj (Abbe Number) |
|---|---|---|---|---|---|
| G1 | 1 | ∞ | 4.40 | 1.80610 | 40.92 |
|  | 2 | 336.3238 | 1.84 |  |  |
|  | 3 | 337.7940 | 29.16 | 1.43387 | 95.20 |

TABLE 15-continued

Example 4 • Lens Data

| | Si (Surface No.) | Ri (Radius of Curvature) | Di (Surface Distance) | Ndj (Refractive Index) | vdj (Abbe Number) |
|---|---|---|---|---|---|
| | 4 | −543.3288 | 27.99 | | |
| | 5 | 376.5563 | 17.30 | 1.43387 | 95.20 |
| | 6 | −2342.0781 | 0.15 | | |
| | 7 | 239.9198 | 21.83 | 1.43387 | 95.20 |
| | 8 | 4154.7360 | 3.47 | | |
| | 9 | 197.7423 | 11.98 | 1.43875 | 94.93 |
| | 10 | 340.0982 | DD[10] | | |
| G2 | *11 | 1801.6016 | 2.80 | 2.00069 | 25.46 |
| | 12 | 82.5579 | 4.44 | | |
| | 13 | −145.8031 | 1.70 | 2.00100 | 29.13 |
| | 14 | 76.7945 | 5.33 | | |
| | 15 | −66.5797 | 1.70 | 1.81600 | 46.62 |
| | 16 | 85.3620 | 5.43 | 1.80809 | 22.76 |
| | 17 | −108.6635 | 0.15 | | |
| | 18 | 356.7659 | 8.72 | 1.80809 | 22.76 |
| | 19 | −35.4485 | 1.70 | 1.88300 | 40.76 |
| | 20 | 302.4562 | 3.02 | 1.43875 | 94.93 |
| | 21 | −251.6744 | DD[21] | | |
| G3 | 22 | 323.4389 | 9.50 | 1.59282 | 68.63 |
| | *23 | −153.0874 | 1.21 | | |
| | 24 | 90.8155 | 15.54 | 1.43875 | 94.93 |
| | 25 | −300.5897 | 3.41 | | |
| | 26 | 228.6289 | 2.00 | 1.84661 | 23.78 |
| | 27 | 88.8264 | 11.14 | 1.43875 | 94.93 |
| | 28 | −422.7862 | 0.12 | | |
| | *29 | 418.6602 | 5.50 | 1.43875 | 94.93 |
| | 30 | −276.5263 | DD[30] | | |
| | 31 (Stop) | ∞ | 6.04 | | |
| G4A | 32 | −93.8333 | 1.50 | 1.77250 | 49.60 |
| | 33 | 78.2939 | 0.12 | | |
| | 34 | 45.3433 | 5.44 | 1.80518 | 25.42 |
| | 35 | 110.9417 | 0.96 | | |
| | 36 | 154.3097 | 1.50 | 1.59282 | 68.63 |
| | 37 | 70.5809 | 15.83 | | |
| G4B | 38 | −57.7094 | 1.80 | 1.80400 | 46.58 |
| | 39 | 104.5596 | 5.23 | 1.80518 | 25.43 |
| | 40 | −59.6899 | 1.32 | | |
| | 41 | −37.9231 | 2.43 | 1.88300 | 40.76 |
| | 42 | 158.8344 | 8.09 | 1.48749 | 70.23 |
| | 43 | −32.8953 | 0.79 | | |
| | 44 | 246.4279 | 9.73 | 1.77250 | 49.60 |
| | 45 | −337.5091 | 8.30 | | |
| G4C | 46 | 172.2597 | 4.62 | 1.80400 | 46.58 |
| | 47 | −80.5186 | 2.16 | | |
| | 48 | −159.4982 | 4.01 | 1.88300 | 40.76 |
| | 49 | 42.2971 | 1.80 | | |
| | 50 | 43.1708 | 7.18 | 1.51633 | 64.14 |
| | 51 | −55.8136 | 0.27 | | |
| | 52 | 51.0806 | 6.80 | 1.48749 | 70.23 |
| | 53 | −52.8116 | 4.87 | 1.88300 | 40.76 |
| | 54 | 101.9735 | 3.92 | 1.51633 | 64.14 |
| | 55 | −97.9667 | 0.00 | | |
| | 56 | ∞ | 33.00 | 1.60863 | 46.60 |
| | 57 | ∞ | 13.20 | 1.51633 | 64.14 |
| | 58 | ∞ | 17.17 | | |

TABLE 16

Example 4 • Specifications (d-Line)

| | Wide Angle | Middle | Telephoto |
|---|---|---|---|
| Zoom Ratio | 1.0 | 30.5 | 105.0 |
| f | 9.30 | 283.54 | 976.32 |
| Bf | 46.39 | 46.39 | 46.39 |
| FNo. | 1.90 | 1.98 | 5.11 |
| 2ω[°] | 64.8 | 2.2 | 0.6 |

TABLE 17

Example 4 • Zoom Spacing

| DD[10] | 1.79 | 185.39 | 199.88 |
|---|---|---|---|
| DD[21] | 299.06 | 60.72 | 1.96 |
| DD[30] | 2.00 | 56.74 | 101.01 |

TABLE 18

Example 4 • Aspherical surface Coefficients

| Si | 11 | 23 | 29 |
|---|---|---|---|
| KA | 3.3621357E+03 | −4.5249977E+00 | −4.1672124E+02 |
| A3 | 1.4149475E−06 | 2.3847119E−07 | −8.3520252E−08 |
| A4 | −4.1700593E−07 | −4.0238726E−08 | 6.9392783E−07 |
| A5 | 3.9826825E−07 | 6.4856731E−09 | −6.0851101E−08 |
| A6 | −1.0624193E−07 | −4.1093774E−09 | 4.4727684E−09 |
| A7 | 2.0687920E−08 | 6.8488723E−10 | −2.3775477E−10 |
| A8 | −2.7162626E−09 | −6.3036942E−11 | 2.8200362E−12 |
| A9 | 2.1010308E−10 | 3.4642613E−12 | 3.2268272E−13 |
| A10 | −6.2993904E−12 | −1.0053652E−13 | −9.9126013E−15 |
| A11 | −2.2021686E−13 | 5.2137691E−16 | −2.4708200E−16 |
| A12 | 2.2837255E−14 | 5.1652757E−17 | 8.5617161E−18 |
| A13 | −3.6431745E−16 | −1.2615538E−18 | 1.1104252E−19 |
| A14 | −8.8216767E−18 | 2.3377851E−20 | 8.1488912E−21 |
| A15 | −1.5557047E−19 | −1.6124611E−21 | −6.3435330E−22 |
| A16 | 6.7017419E−21 | 5.5607444E−23 | 4.3379985E−24 |
| A17 | 1.3963156E−21 | −4.6120764E−25 | 3.1357417E−25 |
| A18 | −6.4203075E−23 | −1.3853795E−26 | −7.0170533E−27 |
| A19 | 7.8905261E−25 | 3.3515312E−28 | 5.8609766E−29 |
| A20 | | −2.1548906E−30 | −2.7797148E−31 |

Example 5

Figure 7:
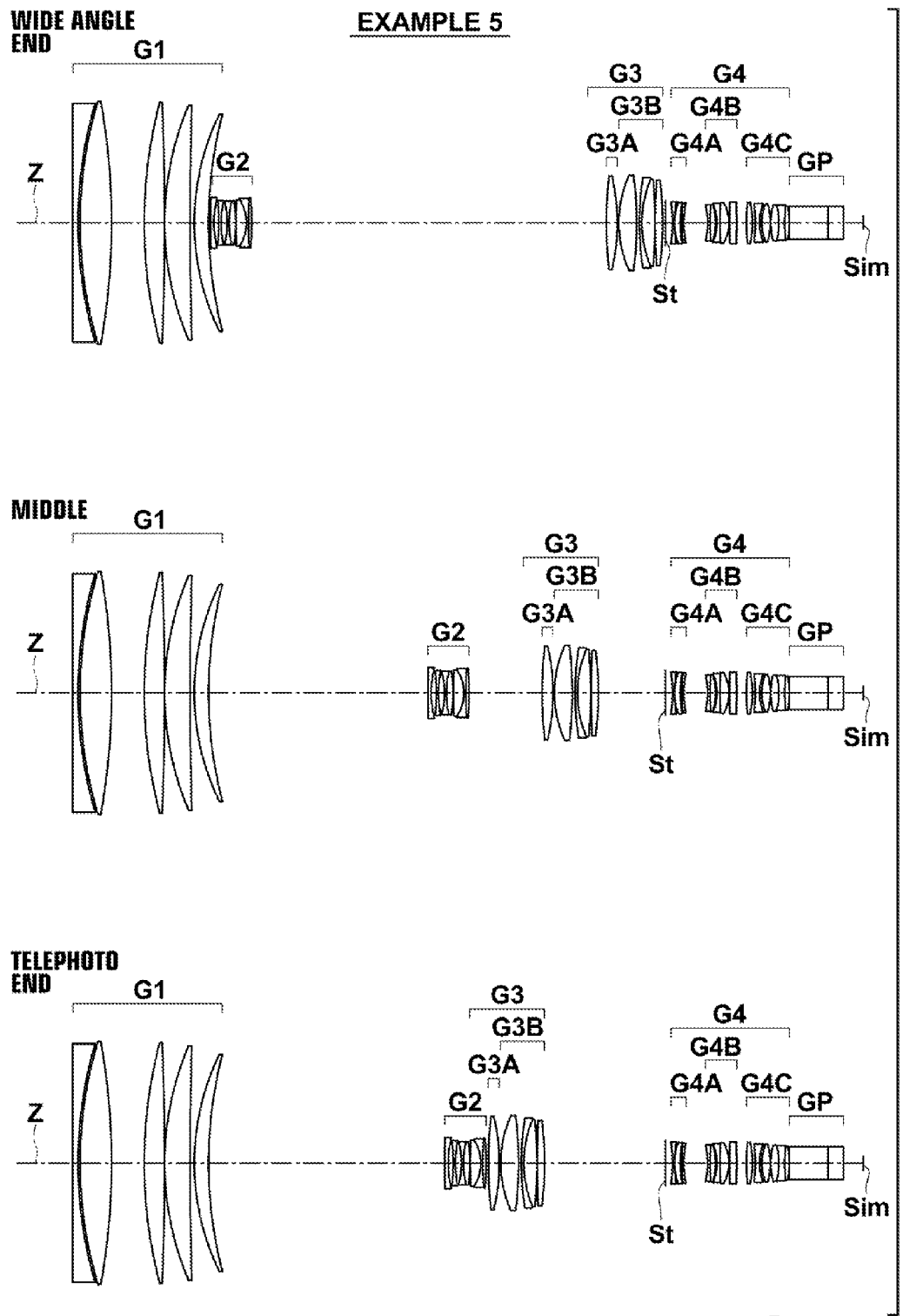
FIG. 7 is a cross-sectional view of a zoom lens of Example 5 of the present invention, illustrating a lens configuration thereof.

A cross-sectional view illustrating a lens configuration of the zoom lens of Example 5 is shown in FIG. 7. The schematic configuration of the zoom lens of Example 5 is almost the same as that of the zoom lens of Example 1 described above.

Basic lens data, specification data, zoom spacing data, and aspherical surface coefficient data of the zoom lens of Example 5 are shown in Tables 19 to 22 respectively, and each aberration diagram of the zoom lens of Example 5 is shown in A to L of FIG. 16.

TABLE 19

Example 5 • Lens Data

| | Si (Surface No.) | Ri (Radius of Curvature) | Di (Surface Distance) | Ndj (Refractive Index) | vdj (Abbe Number) |
|---|---|---|---|---|---|
| G1 | 1 | ∞ | 4.40 | 1.80610 | 40.92 |
| | 2 | 335.5422 | 1.78 | | |
| | 3 | 336.9065 | 26.82 | 1.43387 | 95.20 |
| | 4 | −545.9516 | 27.98 | | |
| | 5 | 375.3730 | 17.29 | 1.43387 | 95.20 |
| | 6 | −2397.8065 | 0.15 | | |
| | 7 | 238.9238 | 21.80 | 1.43387 | 95.20 |
| | 8 | 3776.4035 | 3.48 | | |
| | 9 | 197.7839 | 12.08 | 1.43875 | 94.93 |
| | 10 | 343.1768 | DD[10] | | |
| G2 | *11 | 1830.3086 | 2.80 | 2.00069 | 25.46 |
| | 12 | 74.8783 | 4.40 | | |
| | 13 | −151.7452 | 1.70 | 2.00100 | 29.13 |
| | 14 | 78.1115 | 5.27 | | |
| | 15 | −66.9775 | 1.70 | 1.81600 | 46.62 |
| | 16 | 80.1467 | 5.56 | 1.80809 | 22.76 |
| | 17 | −111.6433 | 0.15 | | |
| | 18 | 358.8976 | 9.07 | 1.80809 | 22.76 |
| | 19 | −33.9870 | 1.70 | 1.88300 | 40.76 |
| | 20 | 325.8243 | 2.78 | 1.43875 | 94.93 |
| | 21 | −259.2209 | DD[21] | | |

TABLE 19-continued

Example 5 • Lens Data

|  | Si (Surface No.) | Ri (Radius of Curvature) | Di (Surface Distance) | Ndj (Refractive Index) | vdj (Abbe Number) |
|---|---|---|---|---|---|
| G3 | 22 | 323.6311 | 9.37 | 1.59282 | 68.63 |
|  | *23 | −153.2368 | 1.20 |  |  |
|  | 24 | 91.2400 | 15.16 | 1.43875 | 94.93 |
|  | 25 | −304.6019 | 2.46 |  |  |
|  | 26 | 234.1563 | 2.00 | 1.84661 | 23.78 |
|  | 27 | 88.9606 | 11.30 | 1.43875 | 94.93 |
|  | 28 | −370.2054 | 0.12 |  |  |
|  | *29 | 416.6438 | 6.31 | 1.43875 | 94.93 |
|  | 30 | −278.9509 | DD[30] |  |  |
|  | 31 (Stop) | ∞ | 6.08 |  |  |
| G4A | 32 | −94.6898 | 1.50 | 1.77250 | 49.60 |
|  | 33 | 78.3355 | 0.12 |  |  |
|  | 34 | 45.2795 | 5.18 | 1.80518 | 25.42 |
|  | 35 | 111.0622 | 1.26 |  |  |
|  | 36 | 203.0600 | 1.50 | 1.49700 | 81.54 |
|  | 37 | 69.9578 | 20.34 |  |  |
| G4B | 38 | −57.9148 | 1.80 | 1.80400 | 46.58 |
|  | 39 | 113.2922 | 4.81 | 1.80518 | 25.43 |
|  | 40 | −59.5497 | 1.22 |  |  |
|  | 41 | −37.9214 | 2.47 | 1.88300 | 40.76 |
|  | 42 | 157.2498 | 8.08 | 1.48749 | 70.23 |
|  | 43 | −32.8401 | 0.19 |  |  |
|  | 44 | 247.4317 | 6.40 | 1.77250 | 49.60 |
|  | 45 | −335.9613 | 8.32 |  |  |
| G4C | 46 | 173.2950 | 5.04 | 1.80400 | 46.58 |
|  | 47 | −80.6054 | 2.23 |  |  |
|  | 48 | −159.8478 | 4.01 | 1.88300 | 40.76 |
|  | 49 | 42.2205 | 1.80 |  |  |
|  | 50 | 43.3331 | 7.23 | 1.51633 | 64.14 |
|  | 51 | −55.8137 | 0.30 |  |  |
|  | 52 | 53.0082 | 6.97 | 1.48749 | 70.23 |
|  | 53 | −52.8316 | 4.87 | 1.88300 | 40.76 |
|  | 54 | 106.6147 | 3.96 | 1.51633 | 64.14 |
|  | 55 | −96.7448 | 0.00 |  |  |
|  | 56 | ∞ | 33.00 | 1.60863 | 46.60 |
|  | 57 | ∞ | 13.20 | 1.51633 | 64.14 |
|  | 58 | ∞ | 16.82 |  |  |

TABLE 20

Example 5 • Specifications (d-Line)

|  | Wide Angle | Middle | Telephoto |
|---|---|---|---|
| Zoom Ratio | 1.0 | 31.9 | 115.0 |
| f | 9.31 | 296.89 | 1070.46 |
| Bf | 46.04 | 46.04 | 46.04 |
| FNo. | 1.98 | 2.06 | 5.60 |
| 2ω[°] | 64.6 | 2.0 | 0.6 |

TABLE 21

Example 5 • Zoom Spacing

| DD[10] | 1.75 | 187.12 | 201.57 |
|---|---|---|---|
| DD[21] | 302.36 | 62.16 | 1.91 |
| DD[30] | 2.39 | 57.21 | 103.02 |

TABLE 22

Example 5 • Aspherical surface Coefficients

| Si | 11 | 23 | 29 |
|---|---|---|---|
| KA | 3.3621357E+03 | −4.5249977E+00 | −4.1672124E+02 |
| A3 | 1.4819223E−06 | 2.5937694E−07 | −5.0904464E−08 |

TABLE 22-continued

Example 5 • Aspherical surface Coefficients

| Si | 11 | 23 | 29 |
|---|---|---|---|
| A4 | −4.5660833E−07 | −4.9487267E−08 | 6.9532784E−07 |
| A5 | 3.9994426E−07 | 6.4577069E−09 | −6.0724763E−08 |
| A6 | −1.0622655E−07 | −4.1003239E−09 | 4.4766146E−09 |
| A7 | 2.0685690E−08 | 6.8519807E−10 | −2.3761140E−10 |
| A8 | −2.7162759E−09 | −6.3034127E−11 | 2.8248080E−12 |
| A9 | 2.1010656E−10 | 3.4640379E−12 | 3.2277196E−13 |
| A10 | −6.6292333E−12 | −1.0055216E−13 | −9.9153248E−15 |
| A11 | −2.2021777E−13 | 5.2083510E−16 | −2.4743855E−16 |
| A12 | 2.2836798E−14 | 5.1644705E−17 | 8.5425049E−18 |
| A13 | −3.6434313E−16 | −1.2612120E−18 | 1.1040793E−19 |
| A14 | −8.8220242E−18 | 2.3409951E−20 | 8.1422750E−21 |
| A15 | −1.5552294E−19 | −1.6111637E−21 | −6.3362792E−22 |
| A16 | 6.7054996E−21 | 5.5624105E−23 | 4.3941662E−24 |
| A17 | 1.3964381E−21 | −4.6312992E−25 | 3.1535397E−25 |
| A18 | −6.4205535E−23 | −1.4008911E−26 | −7.0394865E−27 |
| A19 | 7.8869288E−25 | 3.4206084E−28 | 5.3611144E−29 |
| A20 |  | −2.2251692E−30 | −1.8585390E−31 |

Example 6

Figure 8:
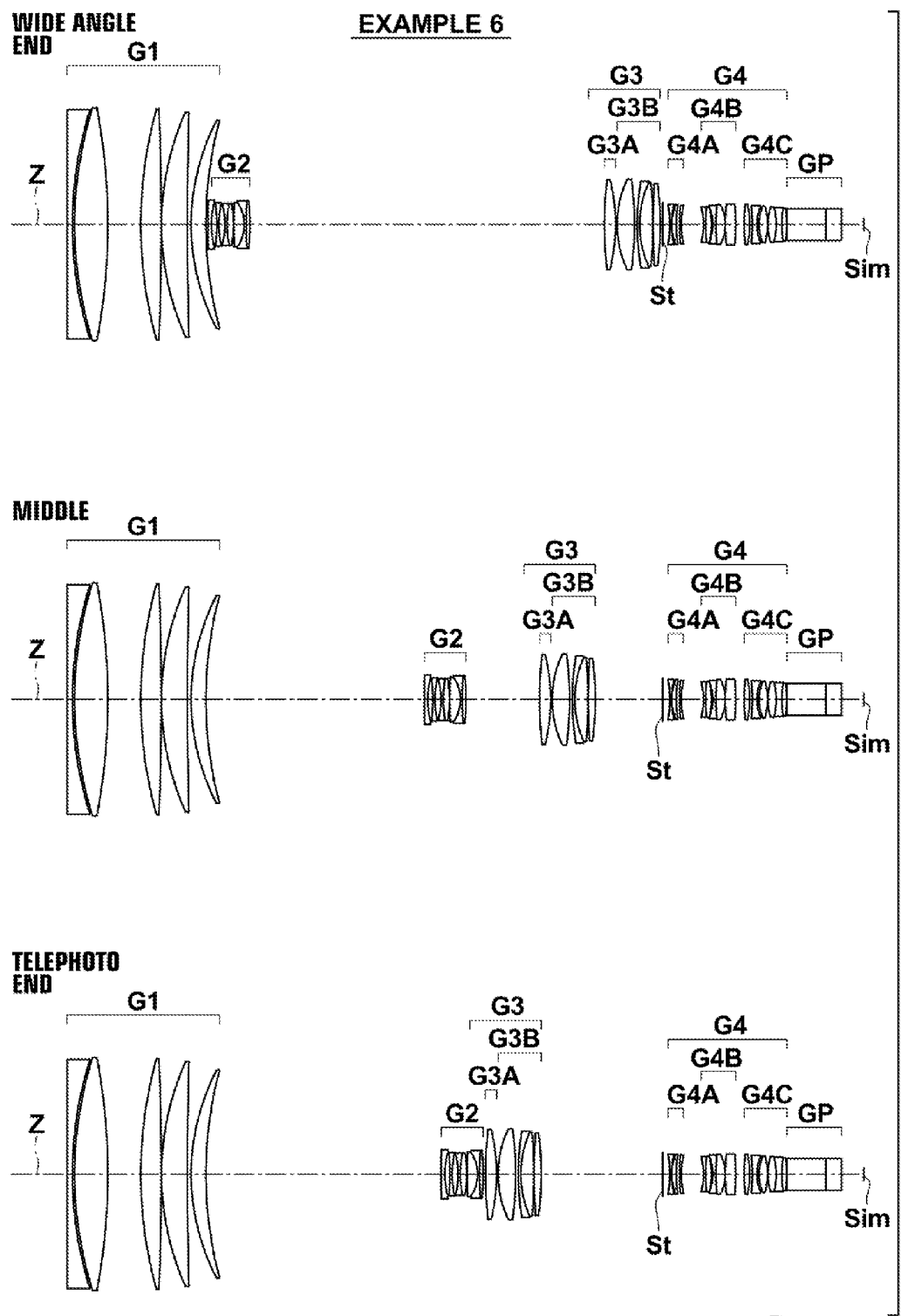
FIG. 8 is a cross-sectional view of a zoom lens of Example 6 of the present invention, illustrating a lens configuration thereof.

A cross-sectional view illustrating a lens configuration of the zoom lens of Example 6 is shown in FIG. 8. The schematic configuration of the zoom lens of Example 6 is almost the same as that of the zoom lens of Example 1 described above.

Figure 17:
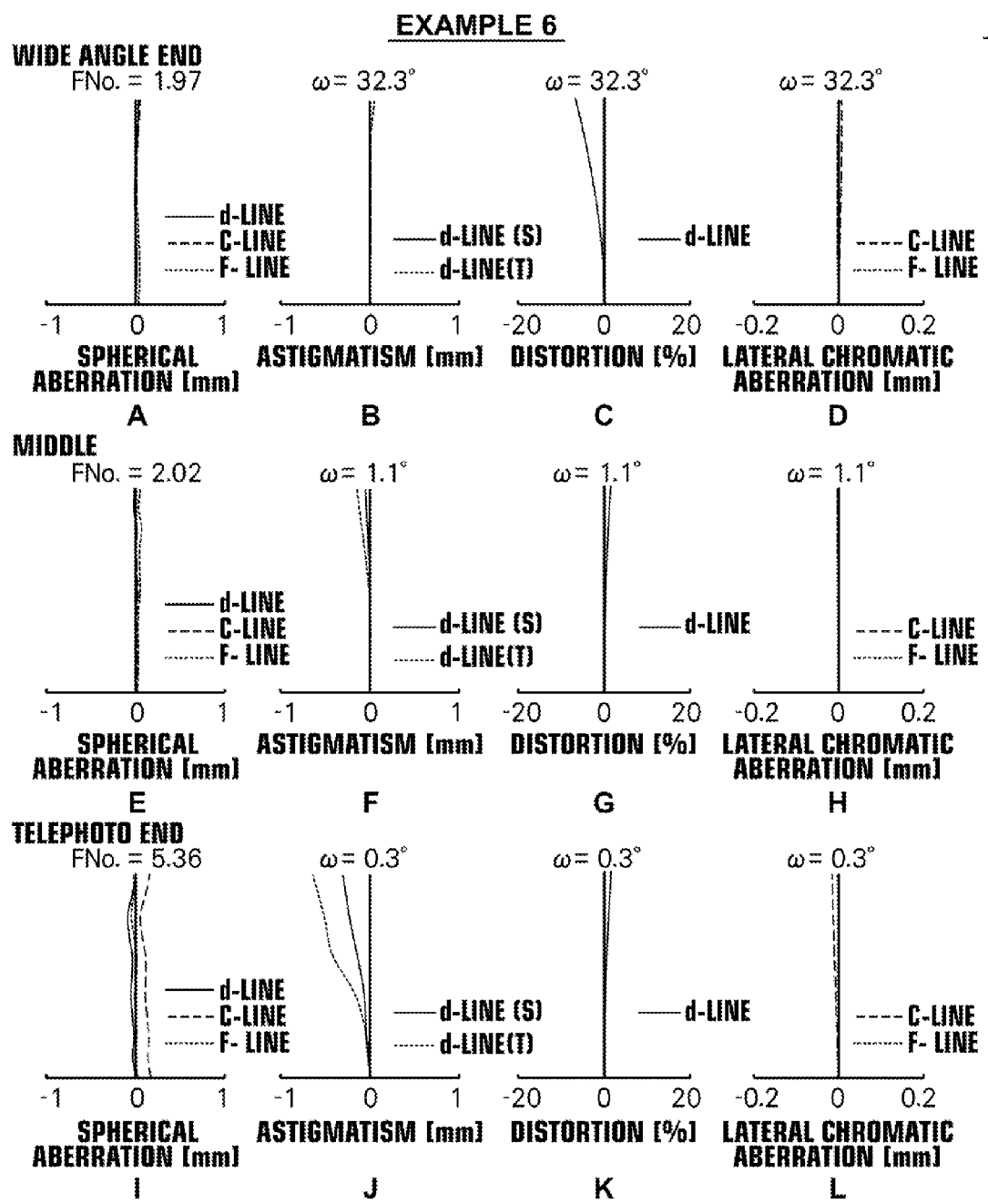
FIG. 17 shows each aberration diagram (A to L) of the zoom lens of Example 6 of the present invention.

Basic lens data, specification data, zoom spacing data, and aspherical surface coefficient data of the zoom lens of Example 6 are shown in Tables 23 to 26 respectively, and each aberration diagram of the zoom lens of Example 6 is shown in A to L of FIG. 17.

TABLE 23

Example 6 • Lens Data

|  | Si (Surface No.) | Ri (Radius of Curvature) | Di (Surface Distance) | Ndj (Refractive Index) | vdj (Abbe Number) |
|---|---|---|---|---|---|
| G1 | 1 | ∞ | 4.40 | 1.80610 | 40.92 |
|  | 2 | 335.1501 | 1.83 |  |  |
|  | 3 | 336.3896 | 28.02 | 1.43387 | 95.20 |
|  | 4 | −544.5979 | 28.00 |  |  |
|  | 5 | 375.1969 | 17.37 | 1.43387 | 95.20 |
|  | 6 | −2324.1115 | 0.15 |  |  |
|  | 7 | 238.7593 | 21.79 | 1.43387 | 95.20 |
|  | 8 | 3658.8401 | 3.22 |  |  |
|  | 9 | 196.7319 | 12.39 | 1.43875 | 94.93 |
|  | 10 | 347.7957 | DD[10] |  |  |
| G2 | *11 | 1897.5959 | 3.00 | 2.00069 | 25.46 |
|  | 12 | 73.9255 | 4.44 |  |  |
|  | 13 | −150.2362 | 1.70 | 2.00100 | 29.13 |
|  | 14 | 78.6081 | 5.23 |  |  |
|  | 15 | −67.4113 | 1.70 | 1.81600 | 46.62 |
|  | 16 | 83.8190 | 5.40 | 1.80809 | 22.76 |
|  | 17 | −113.9354 | 0.15 |  |  |
|  | 18 | 358.5107 | 9.04 | 1.80809 | 22.76 |
|  | 19 | −34.0944 | 1.70 | 1.88300 | 40.76 |
|  | 20 | 361.9716 | 2.95 | 1.43875 | 94.93 |
|  | 21 | −225.9075 | DD[21] |  |  |
| G3 | 22 | 322.2351 | 9.49 | 1.59282 | 68.63 |
|  | *23 | −153.5897 | 1.22 |  |  |
|  | 24 | 92.0402 | 14.70 | 1.43875 | 94.93 |
|  | 25 | −303.9656 | 2.40 |  |  |
|  | 26 | 232.9559 | 2.00 | 1.84661 | 23.78 |
|  | 27 | 89.8667 | 11.21 | 1.43875 | 94.93 |
|  | 28 | −381.3771 | 0.12 |  |  |
|  | *29 | 418.3791 | 5.93 | 1.43875 | 94.93 |
|  | 30 | −291.2561 | DD[30] |  |  |
|  | 31(Stop) | ∞ | 6.04 |  |  |

TABLE 23-continued

Example 6 • Lens Data

|  | Si (Surface No.) | Ri (Radius of Curvature) | Di (Surface Distance) | Ndj (Refractive Index) | vdj (Abbe Number) |
|---|---|---|---|---|---|
| G4A | 32 | −95.2335 | 1.50 | 1.77250 | 49.60 |
|  | 33 | 77.7175 | 0.12 |  |  |
|  | 34 | 45.1673 | 3.84 | 1.80518 | 25.42 |
|  | 35 | 113.8887 | 2.68 |  |  |
|  | 36 | 214.2051 | 1.50 | 1.48749 | 70.23 |
|  | 37 | 69.2144 | 18.70 |  |  |
| G4B | 38 | −57.9826 | 1.80 | 1.80400 | 46.58 |
|  | 39 | 137.2217 | 4.95 | 1.80518 | 25.43 |
|  | 40 | −59.5217 | 1.28 |  |  |
|  | 41 | −37.9283 | 2.51 | 1.88300 | 40.76 |
|  | 42 | 156.8307 | 8.09 | 1.51633 | 64.14 |
|  | 43 | −35.0399 | 0.12 |  |  |
|  | 44 | 247.8292 | 8.41 | 1.77250 | 49.60 |
|  | 45 | −335.4371 | 7.42 |  |  |
| G4C | 46 | 173.4487 | 4.58 | 1.80400 | 46.58 |
|  | 47 | −80.5936 | 2.19 |  |  |
|  | 48 | −160.1090 | 4.01 | 1.88300 | 40.76 |
|  | 49 | 42.2188 | 1.80 |  |  |
|  | 50 | 43.3317 | 7.12 | 1.51633 | 64.14 |
|  | 51 | −55.7727 | 0.31 |  |  |
|  | 52 | 54.1045 | 7.00 | 1.48749 | 70.23 |
|  | 53 | −52.8977 | 4.87 | 1.88300 | 40.76 |
|  | 54 | 108.0040 | 3.88 | 1.51633 | 64.14 |
|  | 55 | −96.0869 | 0.00 |  |  |
|  | 56 | ∞ | 33.00 | 1.60863 | 46.60 |
|  | 57 | ∞ | 13.20 | 1.51633 | 64.14 |
|  | 58 | ∞ | 18.90 |  |  |

TABLE 24

Example 6 • Specifications (d-Line)

|  | Wide Angle | Middle | Telephoto |
|---|---|---|---|
| Zoom Ratio | 1.0 | 30.8 | 110.0 |
| f | 9.31 | 286.76 | 1023.67 |
| Bf | 48.12 | 48.12 | 48.12 |
| FNo. | 1.97 | 2.02 | 5.36 |
| 2ω[°] | 64.6 | 2.2 | 0.6 |

TABLE 25

Example 6 • Zoom Spacing

| DD[10] | 1.76 | 184.23 | 198.72 |
|---|---|---|---|
| DD[21] | 299.22 | 62.01 | 1.94 |
| DD[30] | 2.18 | 56.91 | 102.49 |

TABLE 26

Example 6 • Aspherical surface Coefficients

| Si | 11 | 23 | 29 |
|---|---|---|---|
| KA | 3.3621357E+03 | −4.5249977E+00 | −4.1672124E+02 |
| A3 | 1.4377968E−06 | 2.3051035E−07 | −8.9953179E−08 |
| A4 | −4.7943387E−07 | −5.1081953E−08 | 6.9609829E−07 |
| A5 | 4.0014787E−07 | 6.4293677E−08 | −6.0711069E−08 |
| A6 | −1.0628351E−07 | −4.1007394E−09 | 4.4770472E−09 |
| A7 | 2.0684794E−08 | 6.8519072E−10 | −2.3758435E−10 |
| A8 | −2.7162497E−09 | −6.3034242E−11 | 2.8257914E−12 |
| A9 | 2.1011059E−10 | 3.4640372E−12 | 3.2279896E−13 |
| A10 | −6.6290477E−12 | −1.0055214E−13 | −9.9147416E−15 |
| A11 | −2.2021603E−13 | 5.2083643E−16 | −2.4743052E−16 |
| A12 | 2.2836416E−14 | 5.1644744E−17 | 8.5424393E−18 |
| A13 | −3.6437397E−16 | −1.2612111E−18 | 1.1039778E−19 |
| A14 | −8.8231841E−18 | 2.3409969E−20 | 8.1417959E−21 |

TABLE 26-continued

Example 6 • Aspherical surface Coefficients

| Si | 11 | 23 | 29 |
|---|---|---|---|
| A15 | −1.5552351E−19 | −1.6111633E−21 | −6.3364461E−22 |
| A16 | 6.7082718E−21 | 5.5624114E−23 | 4.3936922E−24 |
| A17 | 1.3966073E−21 | −4.6312986E−25 | 3.1534341E−25 |
| A18 | −6.4202238E−23 | −1.4008942E−26 | −7.0396086E−27 |
| A19 | 7.8832929E−25 | 3.4205823E−28 | 5.3616630E−29 |
| A20 |  | −2.2251011E−30 | −1.8521687E−31 |

Example 7

Figure 9:
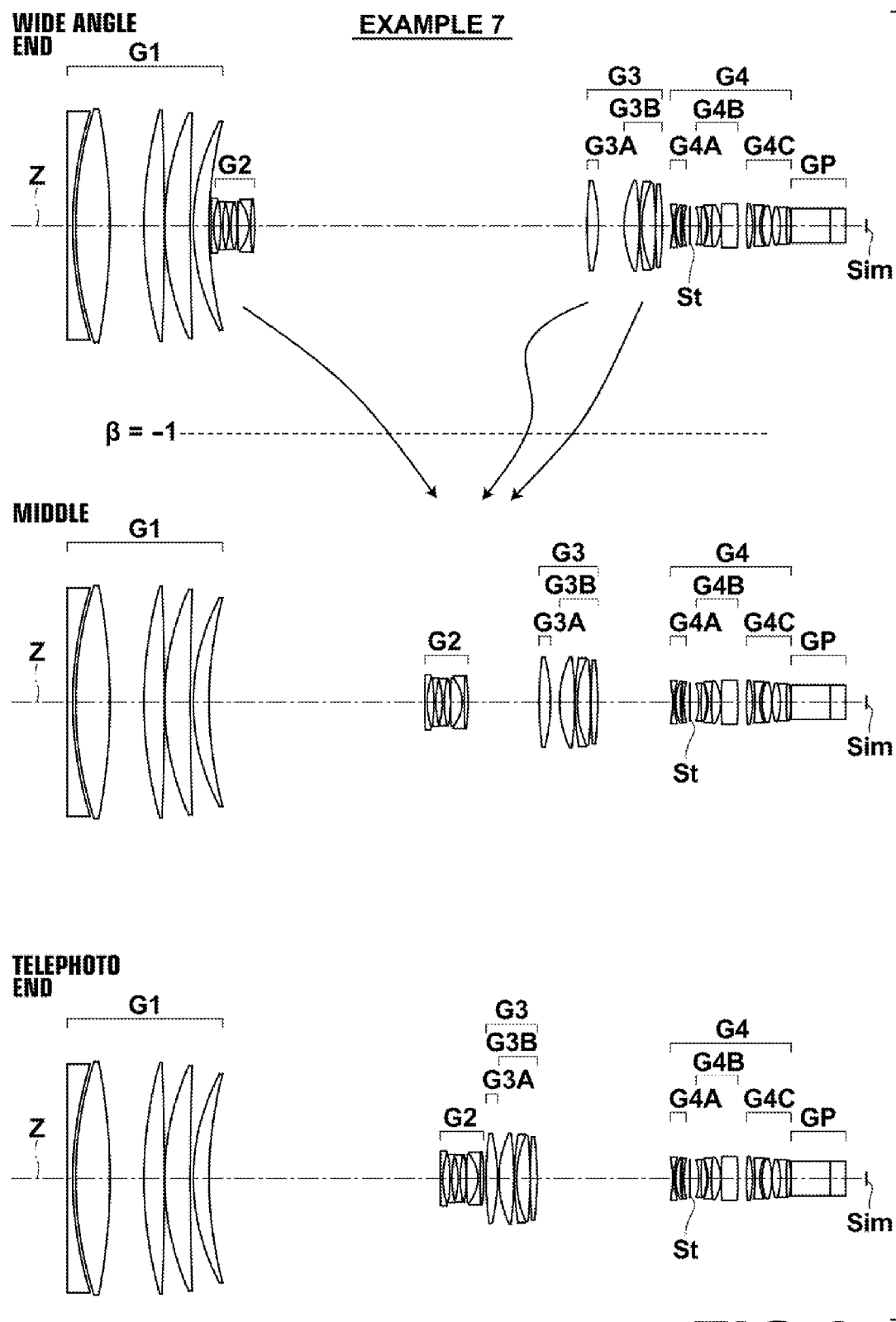
FIG. 9 is a cross-sectional view of a zoom lens of Example 7 of the present invention, illustrating a lens configuration thereof.

A cross-sectional view illustrating a lens configuration of the zoom lens of Example 7 is shown in FIG. 9. The schematic configuration of the zoom lens of Example 7 is almost the same as that of the zoom lens of Example 1 described above, but the position of the aperture stop St is changed. More specifically, the position of the aperture stop St is immediately after the vibration-proof lens group G4A.

Basic lens data, specification data, zoom spacing data, and aspherical surface coefficient data of the zoom lens of Example 7 are shown in Tables 27 to 30 respectively, and each aberration diagram of the zoom lens of Example 7 is shown in A to L of FIG. 18.

TABLE 27

Example 7 • Lens Data

|  | Si (Surface No.) | Ri (Radius of Curvature) | Di (Surface Distance) | Ndj (Refractive Index) | vdj (Abbe Number) |
|---|---|---|---|---|---|
| G1 | 1 | ∞ | 4.40 | 1.80610 | 40.92 |
|  | 2 | 330.8088 | 2.53 |  |  |
|  | 3 | 330.4525 | 28.87 | 1.43387 | 95.20 |
|  | 4 | −527.5923 | 28.82 |  |  |
|  | 5 | 375.7807 | 17.31 | 1.43387 | 95.20 |
|  | 6 | −2364.5977 | 0.15 |  |  |
|  | 7 | 238.4199 | 21.57 | 1.43387 | 95.20 |
|  | 8 | 3114.8765 | 2.53 |  |  |
|  | 9 | 191.7135 | 13.30 | 1.43875 | 94.93 |
|  | 10 | 354.6727 | DD[10] |  |  |
| G2 | *11 | 2138.3058 | 2.00 | 2.00069 | 25.46 |
|  | 12 | 65.5367 | 5.94 |  |  |
|  | 13 | −152.8928 | 1.70 | 2.00100 | 29.13 |
|  | 14 | 79.6694 | 5.30 |  |  |
|  | 15 | −65.2631 | 1.70 | 1.81600 | 46.62 |
|  | 16 | 84.8742 | 5.24 | 1.80809 | 22.76 |
|  | 17 | −119.6936 | 0.15 |  |  |
|  | 18 | 354.6568 | 9.58 | 1.80809 | 22.76 |
|  | 19 | −32.3513 | 1.70 | 1.88300 | 40.76 |
|  | 20 | 340.8002 | 3.30 | 1.43875 | 94.93 |
|  | 21 | −173.8223 | DD[21] |  |  |
| G3 | 22 | 304.7747 | 9.57 | 1.59522 | 67.74 |
|  | *23 | −154.0632 | DD[23] |  |  |
|  | 24 | 93.0907 | 12.75 | 1.43875 | 94.93 |
|  | 25 | −289.4544 | 0.12 |  |  |
|  | 26 | 223.8857 | 2.00 | 1.84661 | 23.78 |
|  | 27 | 92.0001 | 11.34 | 1.43875 | 94.93 |
|  | 28 | −386.6572 | 0.27 |  |  |
|  | *29 | 414.8783 | 5.64 | 1.43875 | 94.93 |
|  | 30 | −309.2525 | DD[30] |  |  |
| G4A | 31 | −91.3741 | 1.50 | 1.77250 | 49.60 |
|  | 32 | 75.9787 | 0.99 |  |  |
|  | 33 | 44.7574 | 4.12 | 1.80518 | 25.42 |
|  | 34 | 114.1464 | 1.30 |  |  |
|  | 35 | 230.0342 | 1.50 | 1.49700 | 81.54 |
|  | 36 | 68.7975 | 5.00 |  |  |
|  | 37(Stop) | ∞ | 7.61 |  |  |
| G4B | 38 | −58.1434 | 1.80 | 1.80400 | 46.58 |
|  | 39 | 269.2053 | 4.71 | 1.80518 | 25.43 |
|  | 40 | −59.2863 | 1.43 |  |  |

TABLE 27-continued

Example 7 • Lens Data

| | Si (Surface No.) | Ri (Radius of Curvature) | Di (Surface Distance) | Ndj (Refractive Index) | vdj (Abbe Number) |
|---|---|---|---|---|---|
| | 41 | −37.8944 | 2.57 | 1.88300 | 40.76 |
| | 42 | 154.0797 | 8.13 | 1.51633 | 64.14 |
| | 43 | −35.0860 | 0.12 | | |
| | 44 | 247.5902 | 14.25 | 1.77250 | 49.60 |
| | 45 | −330.5761 | 7.29 | | |
| G4C | 46 | 172.5555 | 5.15 | 1.80400 | 46.58 |
| | 47 | −80.4140 | 2.05 | | |
| | 48 | −162.4802 | 4.01 | 1.88300 | 40.76 |
| | 49 | 42.0858 | 1.80 | | |
| | 50 | 43.5438 | 8.39 | 1.51633 | 64.14 |
| | 51 | −55.5839 | 0.14 | | |
| | 52 | 52.0967 | 7.07 | 1.48749 | 70.23 |
| | 53 | −53.1324 | 4.87 | 1.88300 | 40.76 |
| | 54 | 164.0877 | 4.06 | 1.51633 | 64.14 |
| | 55 | −95.5253 | 0.00 | | |
| | 56 | ∞ | 33.00 | 1.60863 | 46.60 |
| | 57 | ∞ | 13.20 | 1.51633 | 64.14 |
| | 58 | ∞ | 17.27 | | |

TABLE 28

Example 7 • Specifications (d-Line)

| | Wide Angle | Middle | Telephoto |
|---|---|---|---|
| Zoom Ratio | 1.0 | 29.5 | 109.9 |
| f | 8.49 | 250.80 | 933.46 |
| Bf | 46.49 | 46.49 | 46.49 |
| FNo. | 1.76 | 1.78 | 4.89 |
| 2ω[°] | 69.2 | 2.4 | 0.6 |

TABLE 29

Example 7 • Zoom Spacing

| DD[10] | 1.78 | 181.61 | 194.98 |
|---|---|---|---|
| DD[21] | 280.03 | 59.92 | 1.96 |
| DD[23] | 21.76 | 7.66 | 1.16 |
| DD[30] | 8.75 | 63.12 | 114.22 |

TABLE 30

Example 7 • Aspherical surface Coefficients

| Si | 11 | 23 | 29 |
|---|---|---|---|
| KA | 1.0000000E+00 | −4.5249977E+00 | −4.1672124E+02 |
| A3 | 1.3227001E−06 | 5.0342389E−07 | 4.5408707E−07 |
| A4 | −4.1551577E−07 | −5.4420598E−08 | 6.8862006E−08 |
| A5 | 4.0346676E−07 | 6.0701554E−09 | −6.1459074E−08 |
| A6 | −1.0639918E−07 | −4.1047966E−09 | 4.4463000E−09 |
| A7 | 2.0677579E−08 | 6.8507739E−10 | −2.3815763E−10 |
| A8 | −2.7162738E−09 | −6.3046685E−11 | 2.8347766E−12 |
| A9 | 2.1012515E−10 | 3.4635479E−12 | 3.2392695E−13 |
| A10 | −6.6281987E−12 | −1.0055196E−13 | −9.8695920E−15 |
| A11 | −2.2020125E−13 | 5.2196375E−16 | −2.4657815E−16 |
| A12 | 2.2835149E−14 | 5.1711690E−17 | 8.5271076E−18 |
| A13 | −3.6449899E−16 | −1.2594843E−18 | 1.0844769E−19 |
| A14 | −8.8283386E−18 | 2.3367765E−20 | 8.0626086E−21 |
| A15 | −1.5553791E−19 | −1.6167005E−21 | −6.3478780E−22 |
| A16 | 6.7212726E−21 | 5.5436618E−23 | 4.4685512E−24 |
| A17 | 1.3974922E−21 | −4.5811352E−25 | 3.2018932E−25 |
| A18 | −6.4183948E−23 | −1.3385980E−26 | −6.9880758E−27 |
| A19 | 7.8636825E−25 | 3.1975144E−28 | 4.4700237E−29 |
| A20 | | −2.0203349E−30 | −6.3034703E−32 |

Example 8

Figure 10:
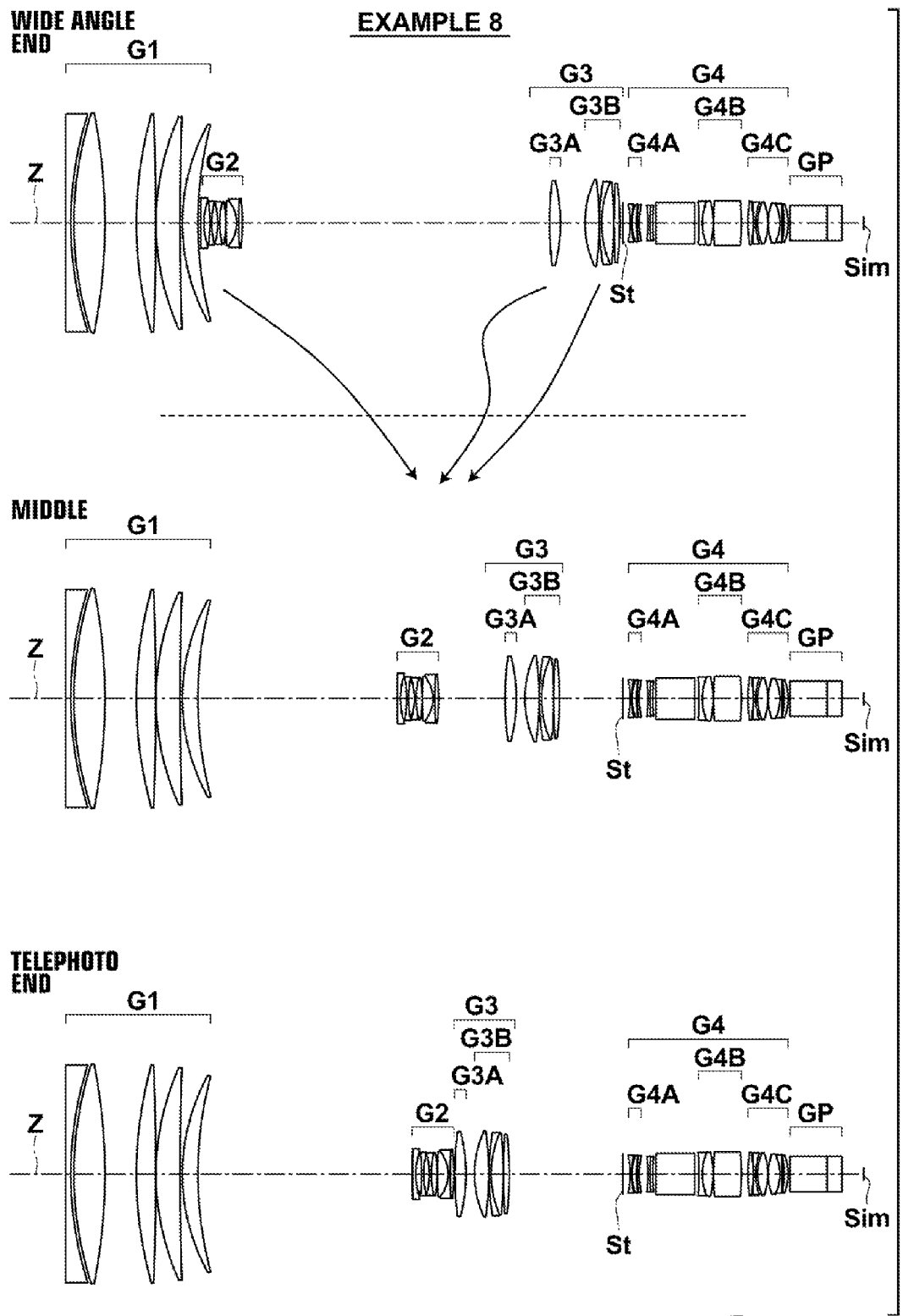
FIG. 10 is a cross-sectional view of a zoom lens of Example 8 of the present invention, illustrating a lens configuration thereof.

A cross-sectional view illustrating a lens configuration of the zoom lens of Example 8 is shown in FIG. 10. The schematic configuration of the zoom lens of Example 8 is almost the same as that of the zoom lens of Example 1 described above, but the fourth lens group G4 includes a lens other than the vibration-proof lens group G4A, the lens group G4B, and the lens group G4C.

Basic lens data, specification data, zoom spacing data, and aspherical surface coefficient data of the zoom lens of Example 8 are shown in Tables 31 to 34 respectively, and each aberration diagram of the zoom lens of Example 8 is shown in A to L of FIG. 19.

TABLE 31

Example 8 • Lens Data

| | Si (Surface No.) | Ri (Radius of Curvature) | Di (Surface Distance) | Ndj (Refractive Index) | vdj (Abbe Number) |
|---|---|---|---|---|---|
| G1 | 1 | ∞ | 4.40 | 1.80610 | 40.92 |
| | 2 | 330.2432 | 2.74 | | |
| | 3 | 329.0564 | 27.63 | 1.43387 | 95.20 |
| | 4 | −523.2689 | 28.42 | | |
| | 5 | 375.3508 | 17.32 | 1.43387 | 95.20 |
| | 6 | −2369.9337 | 0.15 | | |
| | 7 | 238.1740 | 21.54 | 1.43387 | 95.20 |
| | 8 | 2957.3815 | 2.11 | | |
| | 9 | 187.6246 | 13.91 | 1.43875 | 94.93 |
| | 10 | 355.8756 | DD[10] | | |
| G2 | *11 | 2009.1027 | 3.00 | 2.00069 | 25.46 |
| | 12 | 64.8352 | 5.31 | | |
| | 13 | −153.7976 | 1.70 | 2.00100 | 29.13 |
| | 14 | 78.5585 | 5.34 | | |
| | 15 | −64.9986 | 1.70 | 1.81600 | 46.62 |
| | 16 | 85.8120 | 5.35 | 1.80809 | 22.76 |
| | 17 | −121.5185 | 0.15 | | |
| | 18 | 373.3074 | 9.61 | 1.80809 | 22.76 |
| | 19 | −32.3230 | 1.70 | 1.88300 | 40.76 |
| | 20 | 346.0700 | 3.40 | 1.43875 | 94.93 |
| | 21 | −180.2335 | DD[21] | | |
| G3 | 22 | 292.4479 | 9.95 | 1.59282 | 68.63 |
| | *23 | −153.8499 | DD[23] | | |
| | 24 | 94.0952 | 12.71 | 1.43875 | 94.93 |
| | 25 | −291.4572 | 0.12 | | |
| | 26 | 221.2826 | 2.00 | 1.84661 | 23.78 |
| | 27 | 93.0370 | 10.93 | 1.43875 | 94.93 |
| | 28 | −378.3589 | 0.14 | | |
| | *29 | 417.7491 | 5.20 | 1.43875 | 94.93 |
| | 30 | −305.7029 | DD[30] | | |
| | 31(Stop) | ∞ | 6.48 | | |
| G4A | 32 | −84.9426 | 1.50 | 1.77250 | 49.60 |
| | 33 | 81.6251 | 0.12 | | |
| | 34 | 44.3458 | 4.13 | 1.80518 | 25.42 |
| | 35 | 127.0445 | 0.80 | | |
| | 36 | 290.7222 | 1.50 | 1.48749 | 70.23 |
| | 37 | 66.1323 | 7.97 | | |
| | 38 | −130.5840 | 1.86 | 1.88300 | 40.76 |
| | 39 | 331.2399 | 2.39 | 1.84666 | 23.83 |
| | 40 | 172.1029 | 2.74 | | |
| | 41 | ∞ | 35.00 | 1.70154 | 41.24 |
| | 42 | ∞ | 3.35 | | |
| G4B | 43 | −425.8646 | 3.15 | 1.88300 | 40.76 |
| | 44 | 51.5158 | 9.86 | 1.68893 | 31.07 |
| | 45 | −76.9799 | 0.26 | | |
| | 46 | 243.0521 | 25.06 | 1.77250 | 49.60 |
| | 47 | −194.5639 | 5.98 | | |
| G4C | 48 | 193.1656 | 4.72 | 1.51633 | 64.14 |
| | 49 | −93.3757 | 0.27 | | |
| | 50 | −152.0883 | 1.80 | 1.88300 | 40.76 |
| | 51 | 54.4099 | 1.80 | | |
| | 52 | 48.3371 | 9.22 | 1.48749 | 70.23 |
| | 53 | −55.8377 | 0.12 | | |
| | 54 | 52.9060 | 10.51 | 1.48749 | 70.23 |
| | 55 | −41.7546 | 1.80 | 1.88300 | 40.76 |

TABLE 31-continued

Example 8 • Lens Data

| Si (Surface No.) | Ri (Radius of Curvature) | Di (Surface Distance) | Ndj (Refractive Index) | vdj (Abbe Number) |
|---|---|---|---|---|
| 56 | 904.1065 | 1.80 | | |
| 57 | −108.6927 | 3.70 | 1.48749 | 70.23 |
| 58 | −47.9000 | 1.80 | | |
| 59 | ∞ | 33.00 | 1.60863 | 46.60 |
| 60 | ∞ | 13.20 | 1.51633 | 64.14 |
| 61 | ∞ | 19.58 | | |

TABLE 32

Example 8• Specifications (d-Line)

| | Wide Angle | Middle | Telephoto |
|---|---|---|---|
| Zoom Ratio | 1.0 | 29.0 | 106.0 |
| f | 8.58 | 248.72 | 909.55 |
| Bf | 48.80 | 48.80 | 48.80 |
| FNo. | 1.76 | 1.78 | 4.76 |
| 2ω[°] | 69.6 | 2.6 | 0.6 |

TABLE 33

Example 8 • Zoom Spacing

| DD[10] | 2.39 | 178.03 | 191.70 |
|---|---|---|---|
| DD[21] | 274.72 | 59.46 | 0.80 |
| DD[23] | 21.82 | 7.72 | 7.72 |
| DD[30] | 2.79 | 56.51 | 101.50 |

TABLE 34

Example 8 • Aspherical surface Coefficients

| Si | 11 | 23 | 29 |
|---|---|---|---|
| KA | 3.3621357E+03 | −4.5249977E+00 | −4.1672124E+02 |
| A3 | 1.1238908E−06 | 3.9718407E−07 | 2.0947716E−07 |
| A4 | −4.3960025E−07 | −5.4535585E−08 | 6.8512791E−07 |
| A5 | 4.0363327E−07 | 5.9958141E−09 | −6.1562695E−08 |
| A6 | −1.0644984E−07 | −4.1044204E−09 | 4.4406201E−09 |
| A7 | 2.0674918E−08 | 6.8505897E−10 | −2.3831978E−10 |
| A8 | −2.7163017E−09 | −6.3048957E−11 | 2.8307483E−12 |
| A9 | 2.1012867E−10 | 3.4633915E−12 | 3.2383366E−13 |
| A10 | −6.6279291E−12 | −1.0055795E−13 | −9.8708052E−15 |
| A11 | −2.2019064E−13 | 5.2184541E−16 | −2.4651234E−16 |
| A12 | 2.2835264E−14 | 5.1715109E−17 | 8.5343115E−18 |
| A13 | −3.6451604E−16 | −1.2591040E−18 | 1.0885132E−19 |
| A14 | −8.8297805E−18 | 2.3384326E−20 | 8.0773580E−21 |
| A15 | −1.5559886E−19 | −1.6161103E−21 | −6.3458666E−22 |
| A16 | 6.7199372E−21 | 5.5435135E−23 | 4.4531606E−24 |
| A17 | 1.3975047E−21 | −4.6210501E−25 | 3.1910790E−25 |
| A18 | −6.4181502E−23 | −1.3270463E−26 | −7.0129246E−27 |

TABLE 34-continued

Example 8 • Aspherical surface Coefficients

| Si | 11 | 23 | 29 |
|---|---|---|---|
| A19 | 7.8647891E−25 | 3.1921471E−28 | 4.6948138E−29 |
| A20 | | −2.0273111E−30 | −8.9083703E−32 |

Values of zoom lenses of Examples 1 to 8 corresponding to the conditional expressions (1) to (3) are shown in Table 35. Note that each example uses the d-line as the reference wavelength, and the values shown in Table 35 below are those with respect to the reference wavelength.

TABLE 35

| Expression Number | Conditional Expression | Example 1 | Example 2 | Example 3 | Example 4 | Example 5 | Example 6 | Example 7 | Example 8 |
|---|---|---|---|---|---|---|---|---|---|
| (1) | N4 | 1.487 | 1.497 | 1.618 | 1.593 | 1.497 | 1.487 | 1.497 | 1.487 |
| (2) | v4 | 70.230 | 81.540 | 63.330 | 68.630 | 81.540 | 70.230 | 81.540 | 70.230 |
| (3) | f43/f41 | 3.558 | 3.703 | 7.877 | 4.013 | 3.899 | 3.814 | 3.703 | 3.558 |

The foregoing data show that all of the zoom lenses of Examples 1 to 8 satisfy conditional expressions (1) to (3) and have high zoom ratios of 100× or greater with a reduced color shift even during a vibration-proof operation, showing that they are zoom lenses having a high optical performance.

Figure 20:
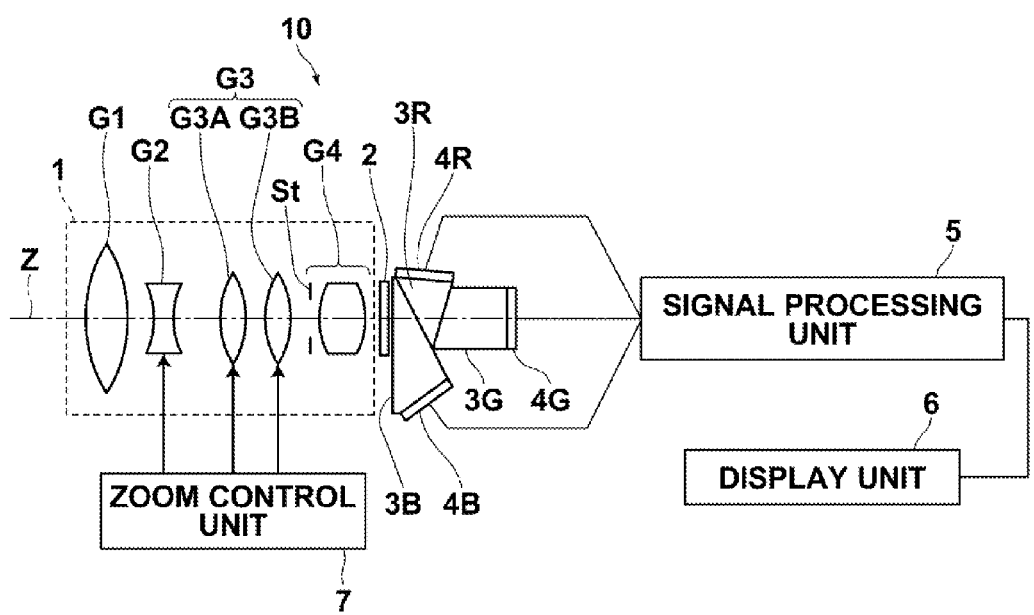
FIG. 20 is a schematic view of an imaging apparatus according to an embodiment of the present invention.

Next, an imaging apparatus according to an embodiment of the present invention will be described with reference to FIG. 20. As an example of imaging apparatus according to an embodiment of the present invention, a schematic configuration diagram of a television camera 10 that uses a zoom lens 1 according to an embodiment of the present invention is shown in FIG. 20. Note that a positive first lens group G1, a negative second lens group G2, a positive third lens group G3 composed of a positive lens group G3A and a positive lens group G3B, an aperture stop St, and a fourth lens group G4 included in the zoom lens 1 are depicted schematically in FIG. 20.

The television camera 10 includes the zoom lens 1, a filter 2 having a low-pass filter function, an infrared cut filter function, and the like disposed on the image side of the zoom lens 1, each prism 3R, 3G, 3B of a color separation prism disposed on the image side of the filter 2, and image sensors 4R, 4G, 4B provided on the end face of each prism. The image sensors 4R, 4G, 4B convert an optical image formed by the zoom lens 1 to an electrical signal and, for example, a CCD, a CMOS, and the like may be used. Each of the image sensors 4R, 4G, 4B is disposed such that the imaging surface thereof corresponds to the image plane of the zoom lens 1.

The television camera 10 further includes a signal processing unit 5 that arithmetically processes output signals from the image sensors 4R, 4G, 4B, a display unit 6 that displays an image formed by the signal processing unit 5, and a zoom control unit 7 that controls zooming of the zoom lens 1. Note that the television camera 10 is a so-called three-CCD imaging apparatus, but the imaging apparatus of the present invention is not limited to this and it may be an imaging apparatus that captures all the wavelength ranges by one image sensor.

So far, the present invention has been described by way of embodiments and examples, but the present invention is not limited to the foregoing embodiments and examples, and various modifications may be made. For example, values of radius of curvature, surface distance, refractive index, Abbe number, partial dispersion ratio, and aspherical surface coefficient of each lens are not limited to those shown in each numerical example described above and may take other values.

Further, in the embodiment of the imaging apparatus, the description has been made by taking a television camera as an example and showing a diagram thereof, but the imaging apparatus of the present invention is not limited to this and the present invention may be applied to other imaging apparatuses, such as video cameras and the like.

What is claimed is:

1. A zoom lens, consisting of a first lens group having a positive refractive power and being fixed during zooming, a second lens group having a negative refractive power and being moved from the object side to the image plane side during zooming from the wide angle end to the telephoto end, a third lens group having a positive refractive power and being moved during zooming, and a fourth lens group having a positive refractive power and being fixed during zooming, in order from the object side wherein:

the second lens group and the third lens group each pass through a point where the imaging magnification of each corresponding lens group is −1× at the same time during zooming from the wide angle end to the telephoto end;

the fourth lens group includes, on the most object side, a vibration-proof lens group G4A which is moved in a direction perpendicular to the optical axis for vibration-proofing;

the vibration-proof lens group G4A is composed of a negative lens L41, a positive meniscus lens L42 with a convex surface on the object side, and a negative lens L43, in order from the object side; and either one of the negative lens L41 and the negative lens L43 satisfies conditional expressions given below:

$$N4 < 1.68 \quad (1)$$

$$58 < \nu 4 \quad (2)$$

where,

N4: refractive index of the negative lens L41 or the negative lens L43, and

ν4: Abbe number of the negative lens L41 or the negative lens L43.

2. The zoom lens of claim 1, wherein the zoom lens satisfies a conditional expression given below:

$$2.5 < f43/f41 < 10 \quad (3)$$

where, f41: focal length of the negative lens L41, and f43: focal length of the negative lens L43.

3. The zoom lens of claim 1, wherein the zoom lens includes a stop between the third lens group and the fourth lens group.

4. The zoom lens of claim 1, wherein:

the fourth lens group includes the vibration-proof lens group G4A, a lens group G4B, and a lens group G4C having an image forming effect, in order from the object side, a stop is provided immediately before or after the vibration-proof lens group G4A; and the focal length is extended from a normal state by switching the lens group G4B to an extender group G4B'.

5. The zoom lens of claim 1, wherein:

the third lens group is composed of a lens group G3A having a positive refractive power and a lens group G3B having a positive refractive power, in order from the object side; and the lens group G3A and the lens group G3B are moved independently during zooming.

6. The zoom lens of claim 1, wherein the zoom lens satisfies conditional expressions given below:

$$N4 < 1.63 \quad (1')$$

$$62 < \nu 4 \quad (2').$$

7. The zoom lens of claim 1, wherein the zoom lens satisfies a conditional expression given below:

$$3 < f43/f41 < 9 \quad (3')$$

where, f41: focal length of the negative lens L41, and f43: focal length of the negative lens L43.

8. An imaging apparatus equipped with the zoom lens of claim 1.

* * * * *